(12) United States Patent
Ohira

(10) Patent No.: US 12,399,012 B2
(45) Date of Patent: Aug. 26, 2025

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Shinji Ohira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 17/178,090

(22) Filed: Feb. 17, 2021

(65) Prior Publication Data

US 2021/0262804 A1    Aug. 26, 2021

(30) Foreign Application Priority Data

Feb. 21, 2020 (JP) ................................ 2020-027743
Dec. 9, 2020 (JP) ................................ 2020-204117

(51) Int. Cl.
*G01C 21/20* (2006.01)
*G01C 25/00* (2006.01)
*G07C 5/08* (2006.01)

(52) U.S. Cl.
CPC ............ *G01C 21/20* (2013.01); *G01C 25/00* (2013.01); *G07C 5/0816* (2013.01)

(58) Field of Classification Search
CPC ...... G01C 21/20; G01C 25/00; G07C 5/0816; G07C 5/0825; G07C 5/0808
See application file for complete search history.

(56) References Cited

U.S. PATENT DOCUMENTS

| | | | |
|---|---|---|---|
| 9,726,754 B2* | 8/2017 | Massanell | G01S 7/4972 |
| 10,088,553 B2* | 10/2018 | Zeng | G01S 13/87 |
| 10,723,281 B1* | 7/2020 | Briggs | G01S 7/497 |
| 10,788,316 B1* | 9/2020 | Kalscheur | G01S 7/4972 |
| 10,948,569 B2* | 3/2021 | Zhou | G01S 13/931 |
| 11,119,190 B2* | 9/2021 | Morinaga | G01S 13/931 |
| 2008/0201033 A1* | 8/2008 | DeMersseman | G01B 21/24 |
| | | | 701/1 |
| 2014/0347486 A1* | 11/2014 | Okouneva | G06T 7/80 |
| | | | 348/148 |

(Continued)

FOREIGN PATENT DOCUMENTS

| | | | |
|---|---|---|---|
| JP | 2009279677 A | | 12/2009 |
| JP | 2019205066 A | * | 5/2018 |
| JP | 2019070983 A | | 5/2019 |

OTHER PUBLICATIONS

Machine translation for JP2019205066A, Ohira Masakazu, May 23, 2018.*

*Primary Examiner* — Abdalla A Khaled
(74) *Attorney, Agent, or Firm* — Canon U.S.A., Inc. IP Division

(57) ABSTRACT

Based on expected position information on a vehicle obtained based on input information input from a sensor when the vehicle makes a predetermined movement with a position/orientation of the sensor maintained relative to the vehicle, and position information on the vehicle estimated based on input information input from the sensor after the vehicle makes the predetermined movement, information related to a change of the position/orientation of the sensor relative to the vehicle after the vehicle makes the predetermined movement, from a held position/orientation, is output.

20 Claims, 12 Drawing Sheets

(56) References Cited

U.S. PATENT DOCUMENTS

| | | | |
|---|---|---|---|
| 2015/0025771 A1* | 1/2015 | Seo | G01C 25/005 701/96 |
| 2015/0049193 A1* | 2/2015 | Gupta | G03B 43/00 348/148 |
| 2015/0145965 A1* | 5/2015 | Livyatan | H04N 13/239 348/47 |
| 2015/0276923 A1* | 10/2015 | Song | G01S 13/931 702/97 |
| 2016/0037032 A1* | 2/2016 | Iwama | H04N 23/54 348/148 |
| 2016/0209211 A1* | 7/2016 | Song | G01S 7/4972 |
| 2016/0236619 A1* | 8/2016 | Tanaka | H04N 7/181 |
| 2016/0349062 A1* | 12/2016 | Campan | G01C 21/365 |
| 2017/0103546 A1* | 4/2017 | Wang | B60R 11/04 |
| 2017/0132808 A1* | 5/2017 | Heinonen | G01S 17/18 |
| 2017/0146667 A1* | 5/2017 | Medagoda | G01S 19/54 |
| 2017/0309042 A1* | 10/2017 | Tanaka | H04N 23/60 |
| 2018/0282977 A1* | 10/2018 | Hiromatsu | E02F 3/435 |
| 2019/0049566 A1* | 2/2019 | Adams | G01C 25/00 |
| 2019/0118712 A1* | 4/2019 | Shigemura | B60Q 9/00 |
| 2019/0206060 A1* | 7/2019 | Matsumoto | G06T 7/0004 |
| 2020/0011969 A1* | 1/2020 | Noro | G01B 21/24 |
| 2020/0019160 A1* | 1/2020 | McArthur | G01S 13/865 |
| 2020/0056909 A1* | 2/2020 | Datta Gupta | G01D 11/245 |
| 2020/0094677 A1* | 3/2020 | Hao | G01S 17/931 |
| 2020/0200566 A1* | 6/2020 | Kim | G06Q 10/047 |
| 2020/0200870 A1* | 6/2020 | Nemati | G01S 7/4026 |
| 2020/0209369 A1* | 7/2020 | Koch | G01S 7/4972 |
| 2020/0380795 A1* | 12/2020 | Melen | G01R 31/007 |
| 2021/0011483 A1* | 1/2021 | Li | G06T 7/74 |
| 2021/0041875 A1* | 2/2021 | Nishiyama | B60W 40/10 |
| 2021/0140795 A1* | 5/2021 | Jozsa | G01C 25/005 |
| 2021/0156711 A1* | 5/2021 | Flade | G01C 25/00 |
| 2021/0215505 A1* | 7/2021 | Castorena Martinez | G01D 18/00 |
| 2021/0255211 A1* | 8/2021 | Szilágyi | G01C 21/185 |
| 2021/0405641 A1* | 12/2021 | Agon | G05D 1/0212 |
| 2022/0172487 A1* | 6/2022 | Ewert | G06V 20/58 |
| 2022/0365193 A1* | 11/2022 | Wetoschkin | G01S 7/4026 |
| 2023/0010175 A1* | 1/2023 | Kato | G01S 17/86 |

\* cited by examiner

INFORMATION PROCESSING DEVICE, INFORMATION PROCESSING METHOD, AND STORAGE MEDIUM

BACKGROUND OF THE DISCLOSURE

Field of the Disclosure

The aspect of the embodiments relates to technologies for estimating positions of a vehicle from information input from sensors.

Description of the Related Art

There is a technology of estimating a position of a vehicle provided with a sensor that measure a distance between an object in the environment and the sensor, based on measurement information obtained by the sensor. The position of the vehicle is estimated with higher accuracy, with positional relationship between the vehicle and the sensor measured (calibration) in advance. In Japanese Patent Application Laid-Open No. 2009-279677, a sensor measures a reference target while a robot is moved by a predetermined amount so that the robot and the reference target satisfies a predetermined relative positional relationship between the robot and the reference target, and the measurement is repeated until the measurement result falls within an error range.

SUMMARY OF THE DISCLOSURE

According to an aspect of the embodiments, a device includes an estimation unit configured to estimate, when a vehicle provided with a sensor makes a predetermined movement, first position information indicating a position of the vehicle based on input information input from the sensor, and an output unit configured to output, based on the estimated first position information and second position information indicating an expected position of the vehicle obtained based on input information input from the sensor when the vehicle makes the predetermined movement with a position/orientation of the sensor relative to the vehicle maintained to be a position/orientation held in a holding unit, output information related to a change of the position/orientation of the sensor relative to the vehicle after the vehicle makes the predetermined movement, from the position/orientation held in the holding unit.

Further features of the disclosure will become apparent from the following description of exemplary embodiments with reference to the attached drawings.

DESCRIPTION OF THE EMBODIMENTS

Figure 1:
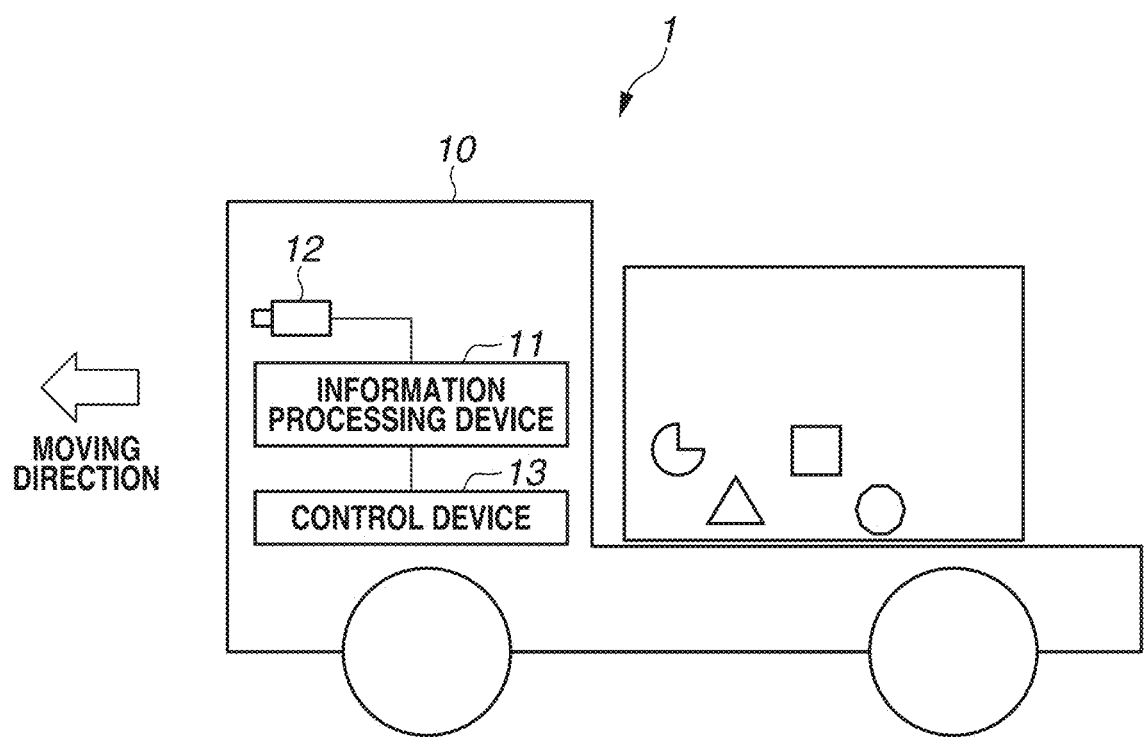
FIG. 1 is a diagram illustrating a system configuration example of an information processing system.

Hereinafter, embodiments will be described in detail with reference to the attached drawings. Note, the following embodiments are not intended to limit the scope of the claimed disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

The method according to Japanese Patent Application Laid-Open No. 2009-279677 does not take into account the fact that some unpredictable factor can change the relative positional relationship between a measurement device (sensor) and a robot (vehicle) to be an inappropriate positional relationship, meaning that an occurrence of such an event is difficult to detect. The occurrence of such an event results in the position of the vehicle becoming unable to be accurately estimated. An exemplary embodiment of the disclosure enables detection of deviation of the position/orientation of a sensor relative to a vehicle from calibrated position/orientation.

In a first exemplary embodiment, a case will be described where an exemplary embodiment of the disclosure is applied to an information processing system including a vehicle provided with a sensor that measures a distance between an object in the environment and the sensor. Specifically, the vehicle as used herein is assumed to be an unmanned carrier. When a vehicle plans a route using positions/orientations estimated based on measured values from a sensor and travels according to the plan, the measurement results from the sensor are converted into a format to be used in movement control of the vehicle. This conversion involves a relative positional relationship between the vehicle and the sensor. In view of this, the positional relationship between the vehicle and the sensor is measured (calibration) in advance, before the vehicle starts traveling. Here, the calibrated relative positional relationship between the sensor and the vehicle is defined as an appropriate positional relationship. However, the sensor can deviate from a calibrated position or orientation while the vehicle is traveling. Specifically, the movement of the vehicle may create an inappropriate relative positional relationship between the sensor and the vehicle. When the actual physical relative positional relationship changes, the vehicle travels based on position estimation results of the vehicle including the change in the position/orientation of the sensor as noise. Thus, the vehicle might travel off the predetermined route. Therefore, in the present exemplary embodiment, the change in the positional relationship between the sensor and the vehicle as a result of straight movement of the vehicle by a predetermined distance is detected. Thus, a change in the relative positional relationship between the sensor and the vehicle is detected. When there is a change, a user is notified of the fact that the relative positional relationship between the sensor and the vehicle is inappropriate. Furthermore, a method performed by the user to correct the positional relationship between the sensor and the vehicle will be described. The sensor according to the present exemplary embodiment is a stereo camera (image sensor).

FIG. 1 illustrates an example of a configuration of an information processing system 1 according to the present exemplary embodiment. The information processing system 1 includes a vehicle 10 that travels on a predetermined route, a sensor 12 that measures the shape of an object in the environment, an information processing device 11 that estimates the position/orientation of the sensor, a control device 13 that controls the vehicle, and an output device that outputs information about a deviation in the positional relationship. In the present exemplary embodiment, the vehicle 10 moves on a horizontal plane, and is, for example, assumed to be an unmanned carrier that carries a load.

The movement control according to the present exemplary embodiment is about controlling a motor that is an actuator and about controlling a steering for changing the orientation of the wheels, which serve as the control device 13 of the vehicle 10. Specifically, the control device 13 moves the vehicle 10 straight forward, backward, left, and right, and turn at a predetermined angle. The vehicle 10 is moved on the predetermined route by inputting movement control information to the control device 13. The movement control information is information for controlling the control device 13, and includes rotational torque of the wheels and a traveling direction. With rotation speed of the wheels and traveling direction set in advance as movement control information for a predetermined operation, the vehicle can be operated to move on a certain trail regardless of the position/orientation of the vehicle or the sensor.

The position of the sensor 12 according to the present exemplary embodiment is defined by three parameters (X, Y, Z) representing the position of the sensor 12 in any world coordinate system defined in the real space. The orientation of the sensor 12 is defined by three parameters (roll, pitch, yaw) representing the orientation of the sensor 12. These total of six parameters indicate the position/orientation of the sensor 12. A three-dimensional coordinate system defined on the sensor with the optical axis of the sensor 12 being the Z axis, the horizontal direction of an image being the X axis, and the vertical direction being the Y axis is referred to as a sensor coordinate system.

On the other hand, the position of the vehicle 10 according to the present exemplary embodiment is defined by two positional parameters (positions X and Y on the horizontal plane with respect to the floor of the real space) of the vehicle 10 on any world coordinate system defined in the real space. The orientation of the vehicle 10 is defined by one orientation parameter (a rotation direction on the horizontal plane with respect to the floor of the real space). The position/orientation of the vehicle 10 is defined by these total of three parameters. A two-dimensional coordinate system defined on the vehicle 10, with a traveling direction of the vehicle 10 being the Y axis and a direction orthogonal to the traveling direction being the X axis, is referred to as a vehicle coordinate system. The vehicle 10 according to the present exemplary embodiment is assumed to move on the horizontal plane.

The relative positional relationship between the sensor 12 and the vehicle 10 according to the present exemplary embodiment is the relative position/orientation between the origin of the sensor coordinate system and the origin of the vehicle coordinate system, and is indicated by the total of six parameters consisting of the three parameters indicating the position and the three parameters indicating the orientation. Using this relative position/orientation, the position/orientation on the sensor coordinate system and the one on the vehicle coordinate system is converted to each other. This positional relationship between the sensor 12 and the vehicle 10 is assumed to have been calibrated in advance using a known technology. With the following processing, when an orientation (position) of the sensor 12 changes from that in an initial state due to vibration of the vehicle 10 or some sort of external cause, a change from the positional relationship that has been known through the calibration preformed in advance is detected.

Figure 2:
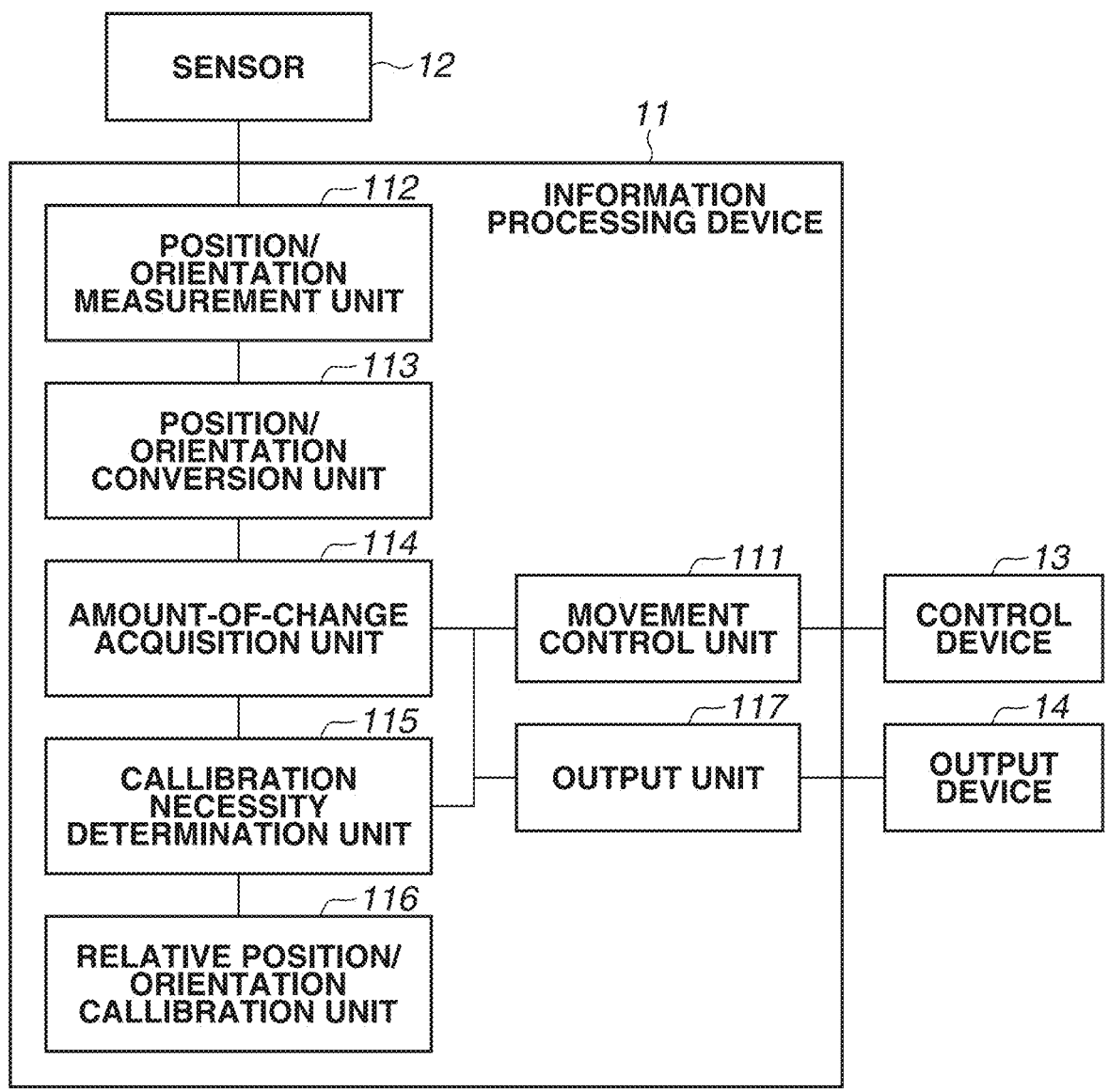
FIG. 2 is a block diagram illustrating a functional configuration example of the information processing device.

FIG. 2 is a diagram illustrating an example of a functional configuration of an information processing device 11 according to the present exemplary embodiment. The information processing device 11 includes a movement control unit 111, a position/orientation estimation unit 112, a position/orientation conversion unit 113, an amount-of-change acquisition unit 114, a calibration determination unit 115, a relative position/orientation calibration unit 116, and an output unit 117. The position/orientation estimation unit 112 is connected to the sensor 12. The movement control unit 111 is connected to the control device 13. The information processing device 11 is connected to the control device 13 that controls the movement of the vehicle 10 and the output device 14 that outputs information about the relative positional relationship between the sensor 12 and the vehicle 10.

The movement control unit 111 generates movement control information for controlling the movement of the vehicle 10, and outputs the movement control information to the control device 13 and the amount-of-change acquisition unit 114.

The position/orientation estimation unit 112 estimates the position/orientation of the sensor 12 based on a measurement value obtained from the sensor 12, and outputs the position/orientation of the sensor 12 to the position/orientation conversion unit 113. The sensor 12 is, for example, a stereo camera, and acquires image information as input information. The input information from the sensor 12 will be hereinafter described as measurement information or a measurement value for the sake of convenience. The position/orientation conversion unit 113 converts the position/orientation of the sensor 12, input by the position/orientation estimation unit 112, from the sensor coordinate system to the vehicle coordinate system, and outputs the result to the amount-of-change acquisition unit 114. The amount-of-change acquisition unit 114 outputs an amount of change in the relative positional relationship between the sensor 12 and the vehicle 10, based on the result of the conversion input from the position/orientation conversion unit 113 and a deviation of the position/orientation of the vehicle 10 as a result of a predetermined operation known in advance. The amount of change thus acquired is output to the calibration determination unit 115 or the output unit 117. The calibration determination unit 115 determines whether the calibration is to be executed, using the amount of change in the relative position/orientation as an input. The determination result is output to the relative position/orientation calibration unit 116. The relative position/orientation calibration unit 116 calibrates the relative position/orientation of the sensor 12 and the vehicle 10 based on the result of determining whether the calibration is to be executed. The output unit 117 outputs output information indicating whether the positional relationship between the sensor 12 and the vehicle 10 after the predetermined operation is the held positional relationship, based on the amount of change in the relative positional relationship between the sensor 12 and the vehicle 10. Specifically, the output information output to the output device 14 corresponds to a difference in the position of the vehicle 10 obtained based on the position (first position information) of the vehicle 10 estimated by the position/orientation conversion unit 113, and a predicted position (second position information) of the vehicle 10 after the predetermined operation associated with the predetermined operation. The second position information is a position of the vehicle 10 expected to be obtained when the vehicle 10 performs the predetermined operation with the relative positional relationship between the sensor 12 and the vehicle 10 maintained. With this configuration, a deviation of the relative positional relationship between the sensor 12 and the vehicle 10 measured in advance can be detected before the traveling starts or during the traveling, and the user can be notified of the deviation.

Figure 3:
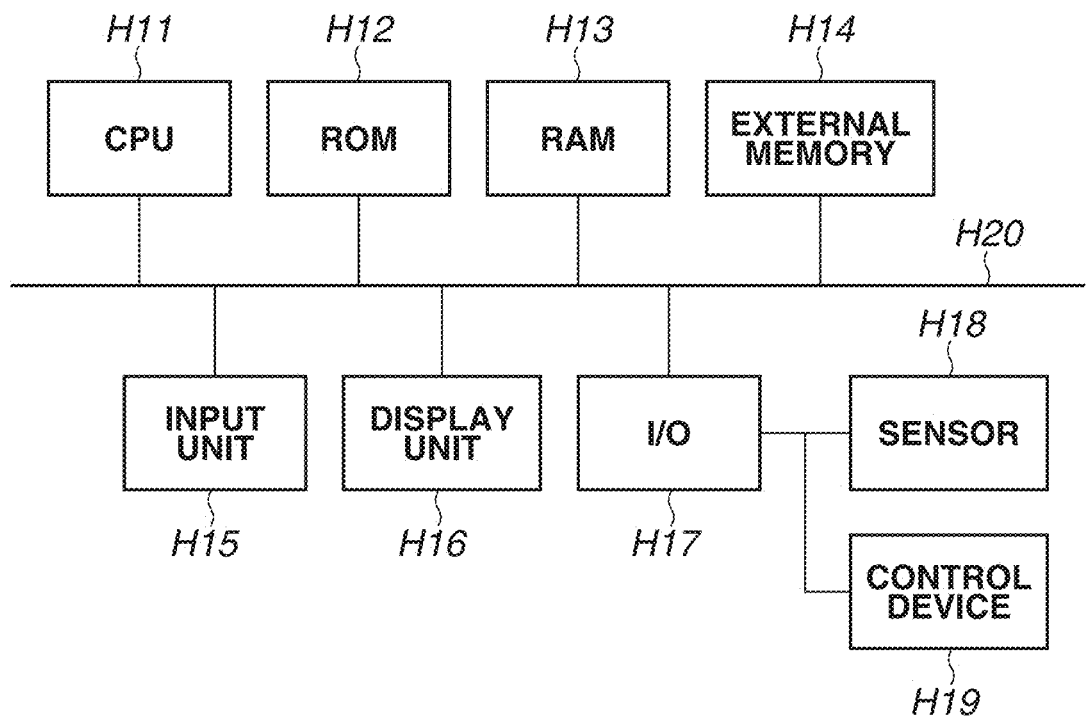
FIG. 3 is diagram illustrating an example of a hardware configuration of the information processing device.

FIG. 3 is a diagram illustrating a hardware configuration of the information processing device 11. A central processing unit (CPU) H11 controls different devices connected to a system bus H20. A read only memory (ROM) H12 stores a basic input/output system (BIOS) program and a boot program. A random access memory (RAM) H13 is used as a main storage device of the CPU H11. An external memory H14 stores a program that the information processing device 11 runs. An input unit H15 is a keyboard, a mouse, and/or a robot controller, and executes processing related to input of information. A display unit H16 outputs a calculation result, obtained by the information processing device 11, to a display device in response to an instruction from the CPU H11. The display device may be of any type, such as a liquid crystal display device, a projector, or a light emitting diode (LED) indicator. A communication interface H17 performs information communication over a network. The communication interface may be of any type, such as Ethernet®, universal serial bus (USB), serial communications, and wireless communications. An I/O H17 receives an image from a sensor H18. A sensor H18 is the sensor 12 described above. A control device H19 is the control device 13 described above.

Figure 4:
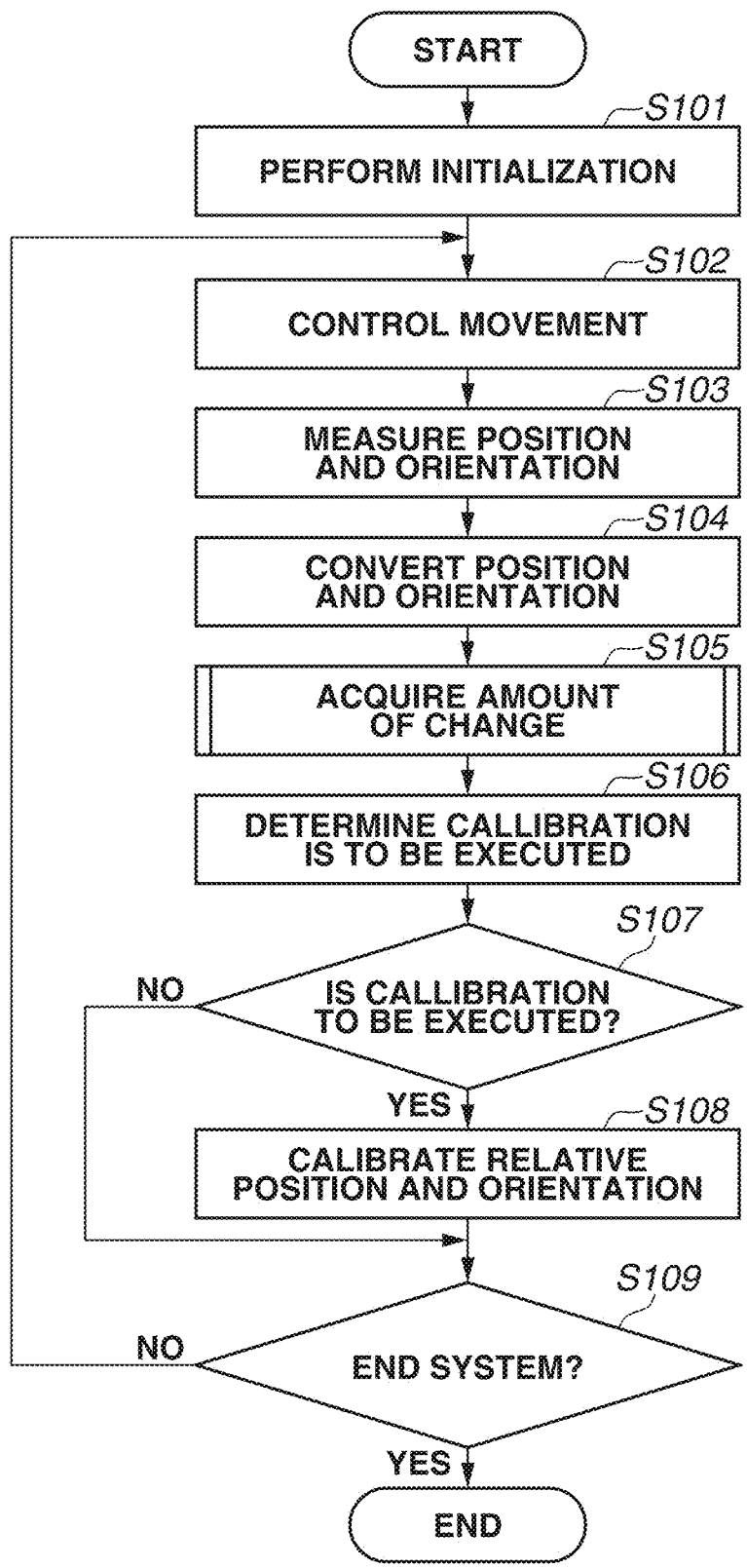
FIG. 4 is a flowchart illustrating processing executed by the information processing device.

FIG. 4 is a flowchart illustrating a processing procedure according to the present exemplary embodiment. The processing includes initialization step S101, movement control step S102, position/orientation estimation step S103, position/orientation conversion step S104, amount-of-change acquisition step S105, calibration determination steps S106 and S107, relative position/orientation calibration step S108, and system end determination step S109. The processing illustrated in the flowchart in FIG. 4 is executed by the CPU H11 in FIG. 3, which is a computer, based on a computer program stored in the external memory H14. In the following description, the description of the word step is omitted with S provided as the first letter for each step.

In step S101, the system is initialized. Specifically, an operable state of the information processing device 11 is achieved with a program read from the external memory H14. Parameters of devices connected to the information processing device 11 and the relative position/orientation of the sensor 12 and the vehicle 10 are read onto the RAM H13. Each control device of the vehicle 10 is started to be in an operable/controllable state.

In step S102, the movement control unit 111 causes the vehicle 10 to perform a predetermined operation based on the control information for the vehicle 10 to perform the predetermined operation. Here, the predetermined operation is an operation of moving straight by a predetermined distance. The control information, such as that indicating how many meters the vehicle 10 moves forward, may be acquired or generated. In the present exemplary embodiment, control is performed with the traveling direction fixed to forward (or backward) so that the vehicle 10 moves straight. Thus, the orientation (direction) of the sensor 12 can be detected without involving a manual operation.

In step S103, the position/orientation estimation unit 112 estimates the position/orientation of the sensor 12 based on the measurement information measured by the sensor 12 at a second time point after the predetermined operation. When the sensor 12 is an image sensor, the measurement information is image information. Here, the trail of the position/orientation of the sensor 12 is estimated based on the measurement information measured by the sensor 12 between a first time point when the predetermined operation has started and the second time point after the predetermined operation. The position/orientation of the sensor 12 thus estimated is referred to as first position information. In the present exemplary embodiment, simultaneous localization and mapping (SLAM) technology is used. One specific example of SLAM processing will be described. SLAM is a method using feature points detected on an image to estimate the position and orientation of a sensor or the like. For example, the information processing device 11 holds, as map information about a scene in which the vehicle 10 provided with the sensor 12 travels, information about a group of three-dimensional points representing a structural feature of a wall and a still object in the scene. Specifically, the information about the group of three-dimensional points in the scene is three-dimensional coordinates of feature points in the world coordinate system. In the present exemplary embodiment, the map information about the scene is generated in advance based on an image obtained by imaging the shape of an object in the environment while the vehicle 10 is traveling, and is stored in a storage device. Based on an input image and the map information, the information processing device 11 minimizes a difference (reprojection error) between a position of a feature point (edge characteristic indicating a shape of a periphery) on the input image, and a position of the feature point projected on the input image using the position/orientation of the sensor 12 at the time of capturing the input image. Thus, the position/orientation of the sensor 12 is estimated. Any other methods of estimating the position/orientation of the sensor 12 from the measurement information may be employed.

Here, a method proposed by Engel et al. (J. Engel, T. Schps, and D. Cremers. LSD-SLAM: Large-Scale Direct Monocular SLAM. ECCV, 2014) is used. With this method, self-position estimation and map generation in a wide area environment such as outdoors are concurrently performed. When the vehicle 10 is in a stopped state before it starts moving, the position/orientation estimation unit 112 outputs the origin of the sensor coordinate system as the position/orientation of the sensor 12. While the vehicle 10 is performing the predetermined operation, the position/orientation of the sensor 12 is continuously measured at predetermined time intervals or distance intervals, and all the pieces of measurement information are output to the position/orientation conversion unit 113. The measurement information is array data on the six position and orientation parameters.

In step S104, the position/orientation conversion unit 113 converts the trail of the position/orientation of the sensor 12, input by the position/orientation estimation unit 112, from the sensor coordinate system to the vehicle coordinate system. Specifically, a change in (trail of) the estimated position/orientation of the sensor 12 is converted into the position/orientation of the vehicle 10 based on the known positional relationship. More specifically, first of all, axes (X, Y, Z) of a coordinate system for the three position parameters and the three orientation parameters are aligned with those of the vehicle coordinate system, by rotating or translating the position and orientation of the sensor 12, based on the relative position/orientation of the sensor 12 and the vehicle 10 held in a holding unit such as the RAM H13. Next, the six position/orientation parameters of the sensor 12 are reduced to three parameters because the vehicle coordinate system has three degrees of freedom. Specifically, data that cannot exist on the vehicle coordinate system is deleted from the array data on the position information. Among the position parameters, data about the Z axis that is the vertical direction is deleted. On the other hand, among the orientation parameters, data about roll (X axis) and pitch (Y axis) other than that about yaw (Z axis) corresponding to the rotation direction on the horizontal plane is deleted. A plurality of pieces of position information about the sensor 12, converted to be on the vehicle coordinate system, is output to the amount-of-change acquisition unit 114. When the vehicle 10 moves straight, the position of the vehicle 10 at the first time point when the predetermined operation has started and the position of the vehicle 10 at the second time point after the predetermined operation may be acquired based on the positional relationship between the sensor 12 and the vehicle 10. This enables estimation to be performed with calculation simpler than that in a case of estimating the trail of movement of the vehicle 10, and thus to be performed with a smaller processing load. When the trail of movement of the vehicle 10 is used, an amount of change in the orientation of the sensor 12 can be estimated with a higher accuracy.

In step S105, the amount-of-change acquisition unit 114 uses the plurality of pieces of position information about the sensor 12 input from the position/orientation conversion unit 113, to acquire an amount of change between the relative position/orientation held in the RAM H13 and the actual physical relative positional relationship between the vehicle 10 and the sensor 12. Specifically, the position/orientation conversion unit 113 acquires a result of converting the position (first position information) of the vehicle 10 or the sensor 12 after the predetermined operation is acquired from measurement information measured by the sensor 12 when the vehicle 10 performs the predetermined operation. Then, the predicted position (second position information) of the vehicle 10 or the sensor 12 when the predetermined operation is performed in the positional relationship set in advance is compared with the position of the vehicle 10 or the sensor 12 after the predetermined operation. When the first position information and the second position information indicate that a difference in the position of the vehicle 10 or the sensor 12 does not exceed a predetermined threshold, the relative positional relationship between the sensor 12 and the vehicle 10 can be regarded as not being changed from a value set in advance. When the vehicle 10 moves straight as in the present exemplary embodiment, the amount of change in the orientation parameter of the relative position/orientation is obtained. The details of the processing will be described.

Figure 5:
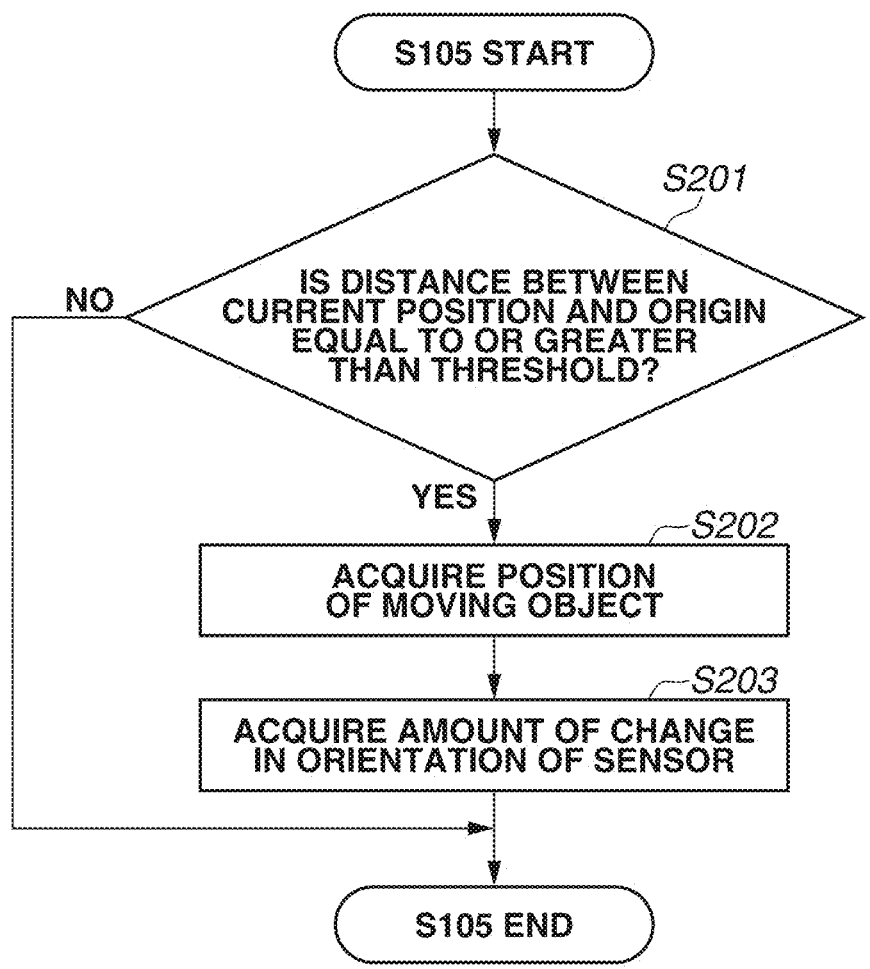
FIG. 5 is a flowchart illustrating processing executed by an amount-of-change acquisition unit.

FIG. 5 is a flowchart illustrating processing executed by the amount-of-change acquisition unit 114. In step S201, the amount-of-change acquisition unit 114 determines whether the amount of a trail represented by the position information input by the position/orientation conversion unit 113 is sufficient to estimate an amount of change in the orientation of the sensor 12. For example, the Euclidean distance between the origin (0,0) and a position parameter (X,Y) of the latest position/orientation is obtained from the position information. If the distance is equal to or greater than a predetermined threshold (YES in step S201), the amount of data about the position/orientation is determined to be sufficient, and the processing proceeds to step S202. If the amount is insufficient (NO in step S201), the amount-of-change acquisition processing is terminated without acquiring the amount of change. A larger amount of position information allows the amount of change in the orientation of the sensor 12 to be estimated with a higher accuracy. This step may be skipped if the amount of change in the orientation of the sensor 12 is obtained by using the positions of the vehicle 10 respectively at the first time point when the predetermined operation has started and the second time point when the predetermined operation has ended.

Figure 6A:
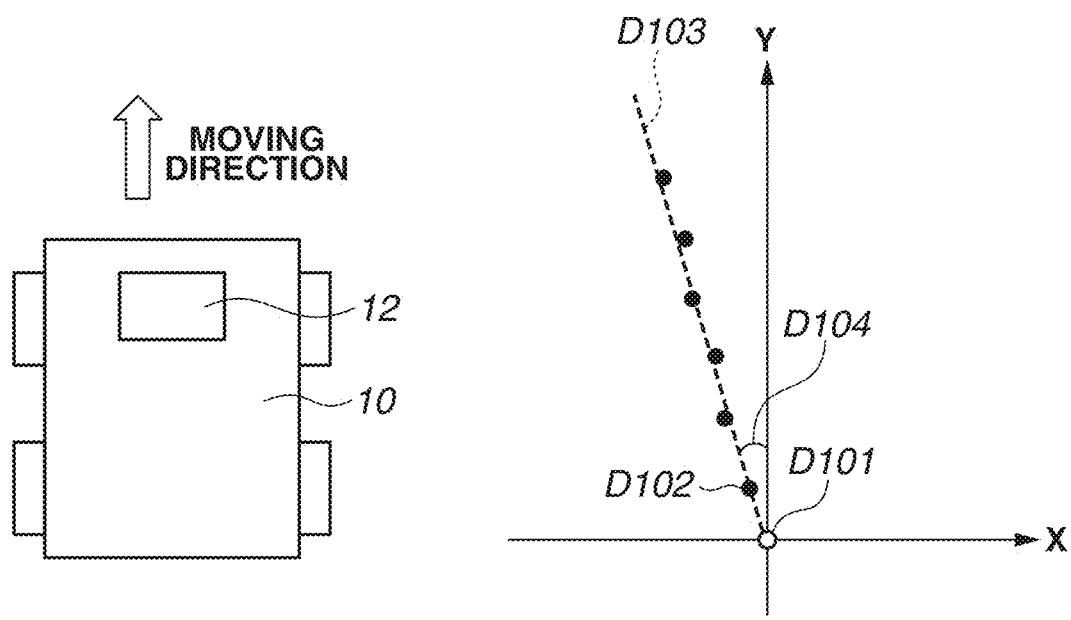
FIGS. 6A and 6B are diagrams illustrating a method of acquiring an amount of change in an orientation parameter of a vehicle.
Figure 6B:
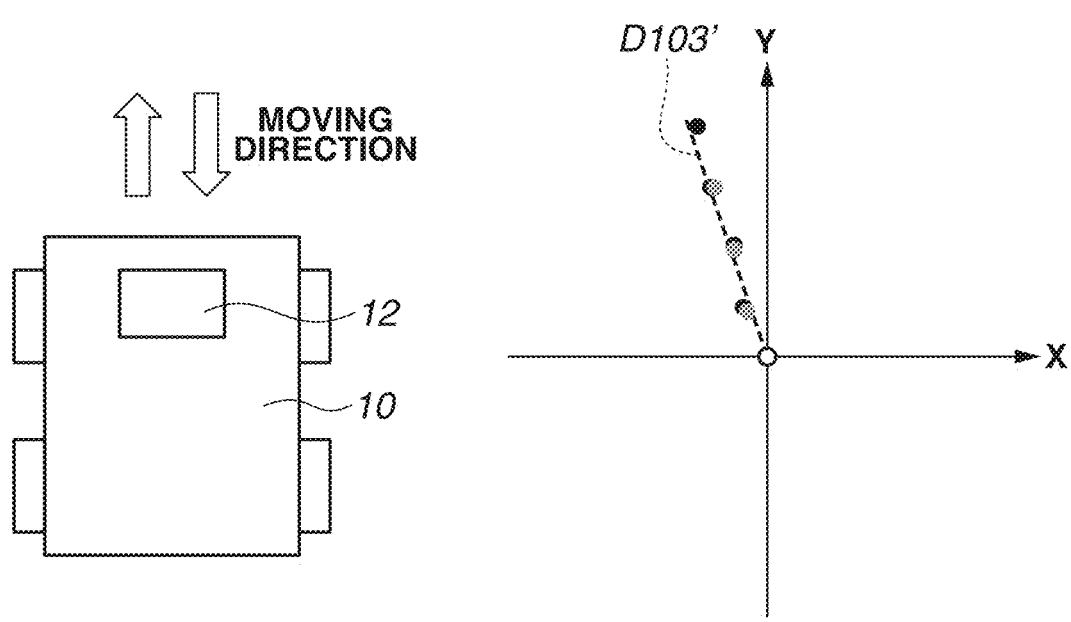

Now, the subsequent processing will be described with reference to FIGS. 6A and 6B. FIG. 6A is a diagram illustrating position information about the sensor 12 in the vehicle coordinate system mapped on a two-dimensional plane. The vehicle 10 provided with the sensor 12 moves straight in the direction illustrated in the figure by a predetermined distance. The origin D101 of the vehicle coordinate system is also the initial position of the sensor 12. Black circles D102 are results of plotting respective position parameters included in the position information about the sensor 12. The trail is indicated by plotting on the vehicle coordinate system, positions traversed by the vehicle 10 between the first time point when the vehicle 10 starts the predetermined operation, and the second time point after the movement through execution of the predetermined operation.

In step S202, the amount-of-change acquisition unit 114 estimates first position information indicating the position of the vehicle 10 after the predetermined operation, from the measurement information measured when the vehicle 10 performs the predetermined operation, based on the positional relationship between the sensor 12 and the vehicle 10. The first position information may be a trail of the sensor 12, and is acquired in an approximate straight line using all the position parameters included in the position information about the sensor 12 as inputs. FIGS. 6A and 6B illustrate this approximate straight line D103. When the trail of the vehicle 10 is used, a change in the orientation of the sensor 12 indicated by D104 can be detected more accurately. To maintain the detection accuracy of the change in the orientation of the sensor 12, the approximate straight line D1003 may not include points where the position has failed to be estimated or measured accurately. For example, the position information about the sensor 12 or the vehicle 10 acquired with the reliability falling below a predetermined value is controlled so as not to be used for estimating the approximate straight line. This step may be skipped if a change in the orientation is detected based on the position of the sensor 12 at the first time point when the predetermined operation has started, and the position of the sensor 12 after the predetermined operation. Such a case involves a smaller amount of information, thus involving a smaller processing load.

In step S203, the amount-of-change acquisition unit 114 outputs a difference in the sensor position based on the first position information and second position information indicating the predicted position of the vehicle 10 (sensor 12) associated with the predetermined operation. In other words, an amount of change in the orientation of the sensor 12 is acquired based on the positions (trail) of the vehicle 10

(sensor 12) before and after the predetermined operation. Specifically, an angle D104 between the approximate straight line D103 and the Y axis in FIGS. 6A and 6B is acquired. In the vehicle coordinate system, the Y axis direction is the moving direction of the vehicle 10. Thus, when the vehicle 10 moves straight, the X coordinate of the position parameter should always be 0 (predicted position). Therefore, a deviation of the approximate straight line of the position information from the Y axis indicates an erroneous conversion of the position information between coordinate systems (from the sensor coordinate system to the vehicle coordinate system) performed by the position/orientation conversion unit 113. This erroneous conversion is caused by a change from the relative positional relationship between the sensor 12 and the vehicle 10 held in the RAM H13, that is, a change in the orientation parameter of the sensor 12. The amount of change in the orientation parameter corresponds to the angle between the approximate straight line of the position information and the Y axis. The angle between these two straight lines is calculated using a trigonometric function. At this point, the processing in step S105 is completed.

The amount of change in the orientation of the sensor 12 acquired as described above is output to the calibration determination unit 115. In step S106, the calibration determination unit 115 acquires the amount of change from the amount-of-change acquisition unit 114. If the acquired amount of change is equal to or greater than a predetermined threshold, it is determined that calibration is to be executed for the relative position/orientation. Otherwise, it is determined that the calibration is to be not executed. In step S107, if the calibration determination unit 115 determines that the calibration is to be executed (YES in step S107), the processing proceeds to S108. Otherwise (NO in step S107), the processing skips the step and directly proceeds to step S109. The determination result thus obtained is input to the output unit 117, and the output information is presented to the user through the predetermined output device 14. For example, if it is determined that the calibration is to be executed (YES in step S107), output information notifying the user of deviation of attachment position/orientation of the sensor 12 is output. The output device 14 and the output information will be described.

In step S108, the relative position/orientation calibration unit 116 corrects the relative position/orientation to make it match the actual physical relative positional relationship between the vehicle 10 and the sensor 12, based on the amount of change in the relative position/orientation acquired by the amount-of-change acquisition unit 114. Specifically, the amount of change in the orientation of the sensor 12 is estimated from the first position information, and the relative positional relationship between the sensor 12 and the vehicle 10 is updated based on the amount of change. More specifically, the angle corresponding to the amount of change is subtracted from the parameter corresponding to Yaw (Z axis) in the vehicle coordinates among the orientation parameters of the relative position/orientation. The relative position/orientation after the calibration is held in the RAM H13 in an overwritten manner.

In step S109, whether the system ends is determined. Specifically, the calibration of the relative position/orientation is determined to be complete and the system ends (YES in step S109), when the amount of change acquired by the amount-of-change acquisition unit 114 is equal to or smaller than the threshold, or when the input unit H15 receives a termination instruction from the user. Otherwise (NO in step S109), the processing returns to step S101, and continues.

In the first exemplary embodiment, the position/orientation is measured based on an image acquired from the sensor 12 when the vehicle 10 moves straight. Then, an amount of change in the orientation parameter of the relative position/orientation of the sensor 12 and the vehicle 10 is acquired, based on the position information including positions/orientations at a plurality of time points. Furthermore, the orientation parameter is corrected from the acquired amount of change. With this configuration, the relative position/orientation of the sensor 12 and the vehicle 10 can be corrected without using a highly accurate movement amount of the vehicle 10, and the change in the relative positional relationship between the vehicle 10 and the position/orientation estimation device can be easily corrected.

(Modification 1-1)

In the first exemplary embodiment, the position/orientation estimation unit 112 employs the SLAM technology using a camera to measure the position/orientation. However, the sensor 12 used in combination with the SLAM technology is not limited to the camera, and may be any sensor. The position/orientation may be measured with a combination of the SLAM technology and an active range sensor based on as LiDAR, Time of Flight, pattern light projection, and the like.

The position/orientation estimation unit 112 is not limited to the SLAM technology, and may employ any approach as long as the position/orientation can be measured. For example, a method based on radio field intensity measurement in wireless communications such as Wi-Fi may be employed. Furthermore, a method using a difference in sensing time of a magnetic tracking sensor or a multitude of optical sensors may be employed. A method of performing model fitting based on computer-aided design (CAD) data, using an image acquired by a camera such as a surveillance camera installed at a certain position may be employed.

(Modification 1-2)

In the first exemplary embodiment, the position/orientation conversion unit 113 converts the position/orientation of the sensor 12 from the sensor coordinate system to the vehicle coordinate system and outputs the result to the amount-of-change acquisition unit 114. However, the positions/orientations may be integrated on any coordinate system, as long as the positions/orientations are integrated on a single coordinate system when the amount-of-change acquisition unit 114 acquires the relative position/orientation. For example, when the positions/orientations are integrated on the sensor coordinate system, the following processing may be executed. The position/orientation conversion unit 113 converts the position/orientation of the vehicle 10, estimated based on the movement control information acquired from the movement control unit 111, from the vehicle coordinate system to the sensor coordinate system, and outputs the result to the amount-of-change acquisition unit 114. On the other hand, the position/orientation of the sensor 12 obtained from the position/orientation estimation unit 112 may be directly output in the sensor coordinate system to the amount-of-change acquisition unit 114. Then, the amount-of-change acquisition unit 114 may acquire the amount of change based on the positions/orientations of both the sensor 12 and the vehicle 10 on the sensor coordinate system.

(Modification 1-3)

Figure 8A:
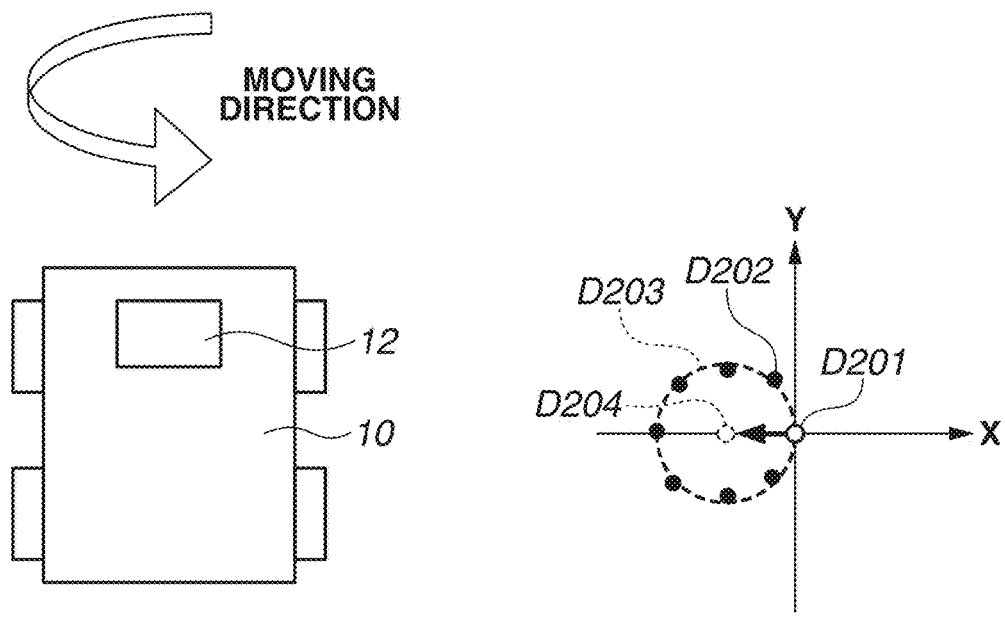
FIGS. 8A and 8B are diagrams illustrating a method of acquiring an amount of change in a position parameter of the vehicle.
Figure 8B:
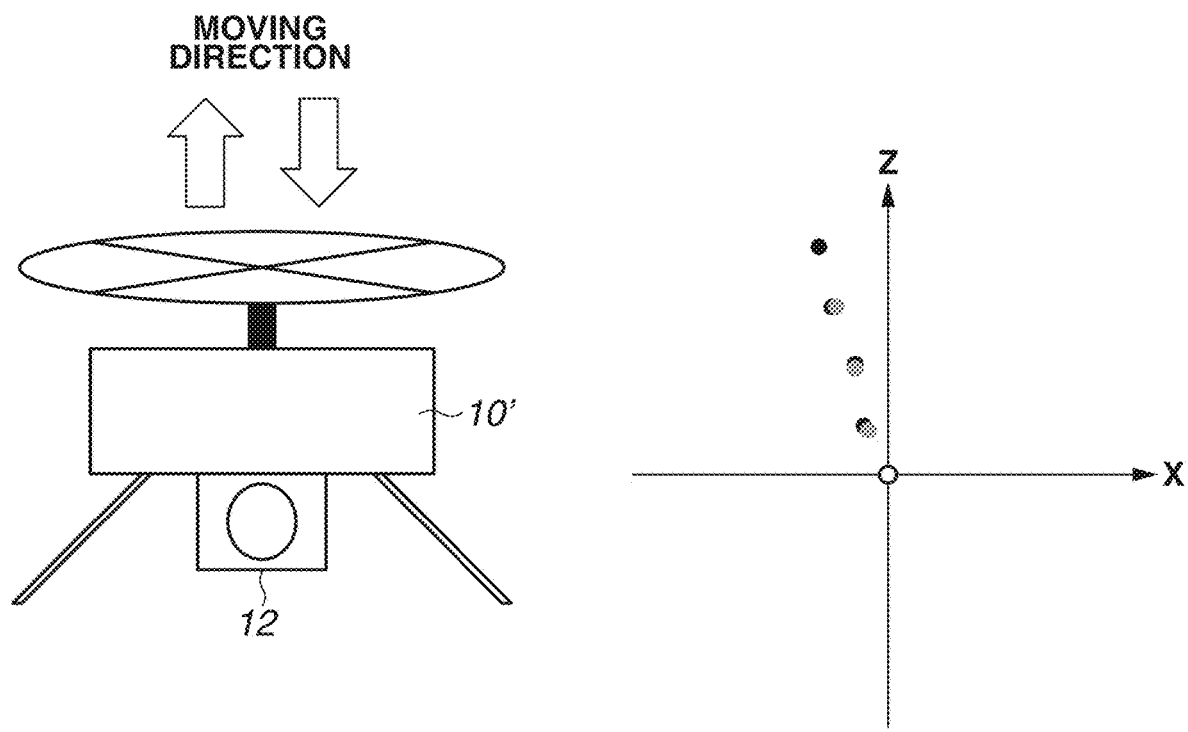

In the first exemplary embodiment, the information processing system 1 is not limited to an unmanned carrier (vehicle). For example, the information processing system 1 may be an autonomous vehicle or an autonomous mobile robot, and the movement control described in the present exemplary embodiment may be applied to these. The present exemplary embodiment may be applied to an unmanned aerial vehicle 10' as illustrated in FIG. 8B. Specifically, the vehicle is a drone. In a case of an aerial vehicle, the inclination of the sensor 12 can be detected from, for example, a downward movement in the direction of gravity (Z axis) and/or an upward movement in the direction opposite to the direction of gravity by a predetermined distance. Alternatively, the present exemplary embodiment may be applied to a robot arm having an arm portion provided with a sensor.

(Modification 1-4)

The output unit 117 outputs output information indicating whether the positional relationship after the predetermined operation matches or does not match the held positional relationship, based on the trail (first position information) of the vehicle 10 estimated after the predetermined operation and a predicted trail (second position information) of the vehicle 10 after the predetermined operation. For example, if the amount of change in the position/orientation of the sensor 12 or the vehicle 10 acquired by the amount-of-change acquisition unit 114 is larger than a predetermined threshold, output information indicating that the positional relationship between sensor 12 and the vehicle 10 matches or does not match the positional relationship held is output to the output device 14. For example, if a lamp of three colors red, yellow, and green is used as a presentation unit, presentation is made in red used to indicate that the amount of change in the relative position/orientation is equal to or greater than the predetermined threshold, and in green used to indicate that the amount of change is smaller than the threshold. Thus, the amount-of-change acquisition result can be visualized for the user. Thresholds may be set for respective levels, so that the notification method may vary depending on which threshold range the amount of change is included in. For example, a first threshold corresponding to a level at which the calibration is definitely to be executed, and a second threshold for notifying that a change from the initial position/orientation has occurred but the change has a limited impact on the position estimation are set in advance. For example, red is lit if the amount of change in the position/orientation of the sensor 12 acquired is equal to or greater than the first threshold. Yellow is lit if the amount of change is smaller than the first threshold and is equal to or greater than the second threshold. Green is lit if the amount of change is smaller than the second threshold. Specifically, if a difference between the positions of the vehicle 10 indicated by the first measurement information and the second measurement information is greater than the first threshold, the output information is output to a first output device. If the difference between the positions of the vehicle 10 indicated by the first measurement information and the second measurement information is greater than the second threshold smaller than the first threshold, the output information is output to a second output device. The output device 14 may be an LED lamp or may be a liquid crystal display, as long as information about the amount-of-change acquisition result can be presented to the user. The output device may be an audio output device such as a speaker, and may be configured to provide certain audible information (such as an alarm sound or a melody) based on a map update status. The output device may be a projection device. For example, if the relative positional relationship between the sensor 12 and the vehicle 10 is detected to be inappropriate, the proper attachment position/orientation of the sensor 12 may be projected by a projection device or a display device. Specifically, the proper position/orientation of the sensor 12 may be projected by a projector, so that the attachment position/orientation of the sensor 12 can be presented to the user in an easily understandable manner.

(Modification 1-5)

The vehicle 10 may be set to automatically perform a predetermined operation at a predetermined timing. For example, the vehicle 10 may be configured to perform a predetermined operation of moving straight by a predetermined distance and then immediately coming back, at points of time the information processing system 1 starts or ends. This enables a change in the positional relationship between the vehicle 10 and the sensor 12 to be detected before the vehicle 10 starts autonomous traveling using the sensor 12, whereby the vehicle 10 can be controlled more safely. A change in the orientation of the sensor 12 results in moving along a trail D103' twice as illustrated in FIG. 6B. No change in the orientation of the sensor 12 results in a trail of moving on the Y axis by a predetermined distance and coming back. With the movement along the same trail occurring twice, the amount of measurement information is increased and an amount of change in the orientation of the sensor 12 can be more accurately acquired. When the vehicle 10 starts or stops, the vehicle 10 may be set to travel to a predetermination location (a charging spot or a standby space, for example). In such a case, the amount of change in the orientation of the sensor 12 described above may be acquired at a timing when the vehicle 10 becomes close to the predetermined location (a timing when the position of the vehicle 10 enters a predetermined range from a target location). With the relative positional relationship between the sensor 12 and the vehicle 10 thus checked at a predetermined timing, the position of the vehicle 10 can be measured more accurately and more stably. With the trigger set at a timing enabling the user to immediately recognize the detection result, the processing described above can be executed at any appropriate timing. Thus, the relative positional relationship between the sensor 12 and the vehicle 10 can be easily detected to be in an inappropriate positional relationship.

In the first exemplary embodiment, the relative position/orientation of the vehicle 10 and the sensor 12 are corrected, based on a result of acquiring a relative amount of change in the orientation parameters of the sensor 12 and the vehicle, based on the position information about the sensor 12 obtained with the vehicle 10 moving along a straight line moving trail. According to a second exemplary embodiment, the relative position parameters of the sensor 12 and the vehicle 10 can also be corrected. Thus, in the second exemplary embodiment, the relative position/orientation is corrected using a result of acquiring an amount of change in the relative position parameters of the sensor 12 and the vehicle 10 based on the position information about the sensor 12 obtained with the vehicle 10 turning.

The diagram illustrating the configuration according to the present exemplary embodiment is the same as FIG. 2 illustrating the configuration of the information processing device 11 described in the first exemplary embodiment, and thus the description thereof will be omitted. The hardware configuration may also be the same as that in the first exemplary embodiment illustrated in FIG. 3. The diagram illustrating the processing procedure according to the present exemplary embodiment is the same as FIG. 4 illustrating the processing procedure performed by the information processing device 11 described in the first exemplary embodiment, and thus the description thereof will be omitted. Processing procedures different from those in the first exemplary embodiment will be described, and description on the other procedures, which are regarded as being the same as those in FIG. 4, will be omitted.

In step S102, the movement control unit 111 performs movement control on the vehicle 10 by outputting, to the control device 13, movement control information for turning the vehicle 10 by a predetermined rotation amount. With the movement control according to the present exemplary embodiment, the vehicle 10 makes a rotary motion with which the orientation parameter is changed, with no movement of the position parameter from the origin that is the initial position on the vehicle coordinate system.

In step S105, the amount-of-change acquisition unit 114 uses the position information about the sensor 12 input by the position/orientation conversion unit 113, to acquire an amount of change between the relative position/orientation held in the RAM H13 and the actual physical relative positional relationship between the vehicle 10 and the sensor 12. If the vehicle 10 makes the rotary motion involving a change in the orientation of the vehicle according to the present exemplary embodiment, the amount of change in the position parameter of the relative position/orientation is obtained.

Figure 7:
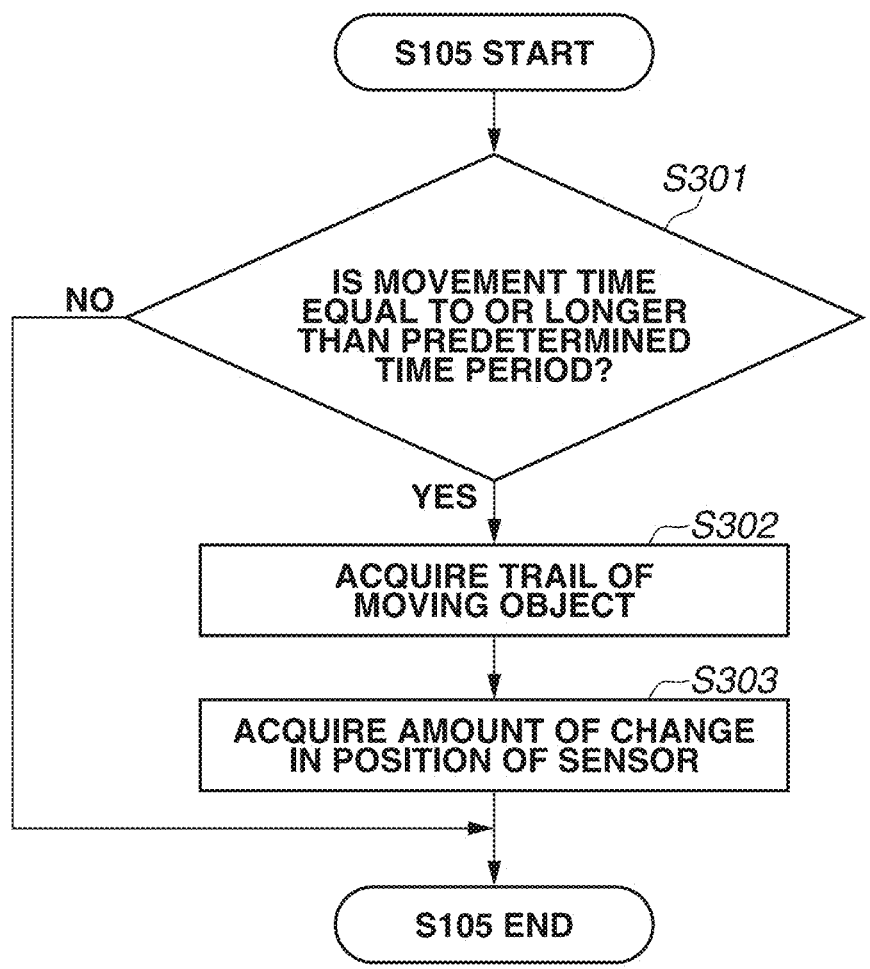
FIG. 7 is a flowchart illustrating processing executed by the amount-of-change acquisition unit.

FIG. 7 is a flowchart illustrating a detailed procedure of the amount-of-change acquisition processing. In step S301, the amount-of-change acquisition unit 114 determines whether the amount of positions/orientations in the position information input from the position/orientation conversion unit 113 is sufficient to acquire the amount of change. The position/orientation estimation unit 112 measures the position/orientation at constant time intervals, and thus the movement time is proportional to the amount of data about the position/orientation. If the movement time is equal to or longer than a predetermined time period (YES in step S301), the amount of data is determined to be sufficient, and the processing proceeds to step S302. If the amount is insufficient (NO in step S301), the amount-of-change acquisition processing is terminated without acquiring the amount of change.

Now, the subsequent processing will be described with reference to FIG. 8A. FIG. 8A is a diagram illustrating position information about the sensor 12 on the vehicle coordinate system mapped on a two-dimensional plane. The origin D201 of the vehicle coordinate system is also the initial position of the sensor 12. Black circles D202 are results of plotting respective position parameters included in the position information. The vehicle 10 performs an operation of turning in the illustrated moving direction.

In step S302, the amount-of-change acquisition unit 114 obtains an approximate circle using all the position parameters included in the position information about the sensor 12 as inputs. In the present exemplary embodiment, the rotary motion involving a change in the orientation parameter is performed, meaning that the position parameter is not supposed to change from the origin. However, a change in the position parameter of the relative position/orientation results in a trail approximate to a circle obtained with the position information about the sensor 12. Thus, the approximate circle is obtained. FIGS. 6A and 6B illustrate this approximate circle D203.

In step S303, the amount-of-change acquisition unit 114 acquires a difference between the center coordinates of the approximate circle and the initial position coordinates. Since the initial position coordinates are the origin, the difference indicates the center coordinates of the approximate circle obtained in the position information, and thus indicates the amount of change. In FIGS. 8A and 8B, since the center coordinates D204 of the approximate circle of the position information is shifted from the origin along the X axis, and thus indicates a change in the X coordinate of the position parameter. The amount of change acquired as described above is output to the calibration determination unit 115.

In step S108, the relative position/orientation calibration unit 116 corrects the relative position/orientation to make it match the actual physical relative positional relationship between the vehicle 10 and the sensor 12, based on the amount of change in the relative position/orientation acquired by the amount-of-change acquisition unit 114, as in the first exemplary embodiment. Specifically, the amount of change is subtracted from the parameters in the X/Y axis direction on the vehicle coordinate system, among the position parameters of the relative position/orientation. In the example illustrated in FIGS. 8A and 8B, since the change in the X axis direction has occurred, the X coordinate is subtracted by the amount of change. The relative position/orientation after the calibration is held in the RAM H13 in an overwritten manner.

In the second exemplary embodiment, when the vehicle 10 makes a rotary motion which changes the orientation, the amount of change in the relative position parameters of the vehicle 10 and the sensor 12 is acquired from the position information about the sensor 12. Furthermore, the relative position/orientation is corrected using the amount of change thus acquired. With this configuration, the relative position/orientation of the sensor 12 and the vehicle 10 can be corrected without using a highly accurate movement amount of the vehicle 10, and the change in the relative positional relationship between the vehicle 10 and the position/orientation estimation device can be easily corrected.

(Modification 2-1)

In the first and second exemplary embodiments, the movement control unit 111 performs the movement control to move the vehicle 10 straight (first exemplary embodiment) and turn it (second exemplary embodiment). However, the movement control is not limited to those. Any movement control can be performed on the vehicle 10 as long as the movement trail includes the straight movement, turning, or both. For example, a U-turn, an L-shaped movement, or a movement trail drawing a rectangle may be implemented. With movement control for such a combination of the straight movement and turning, in the trail obtained from the position information about the sensor 12, the straight line segment and non-straight line segment (for example, portions where the vehicle 10 takes a turn or turns back) are separated from each other. The amount-of-change acquisition processing according to the first and the second exemplary embodiment is applied to each of the separated trails, so that the amount of change in each of the position and orientation parameters of the relative position/orientation is acquired for each of the separated trails.

(Modification 2-2)

In the first and the second exemplary embodiments, the movement control unit 111 outputs the movement control information to the control device 13, to move the vehicle 10 itself. However, the vehicle 10 itself may not move, as long as the vehicle 10 can move along a predetermined movement trail. For example, the vehicle 10 may be placed on a device such as a moving stage or a turntable to move or rotate. In this case, the measurement information can be acquired by the sensor 12 without controlling the vehicle 10 itself, whereby a change in the positional relationship between the sensor 12 and the vehicle 10 can be detected more accurately.

In the first and second exemplary embodiments, when the movement control is performed to cause a predetermined movement of the vehicle 10 such as straight movement and turn, the amount of change in the relative position/orientation of the sensor 12 and the vehicle 10 is acquired based on the position/orientation of the sensor 12, and the relative position/orientation is corrected based on the amount of change. In a third exemplary embodiment, a method is further described in which the vehicle 10 automatically calibrates the relative position/orientation of the sensor 12 and the vehicle 10, while autonomously traveling on a predetermined route. In the present exemplary embodiment, a particular case is described where a section in which the predetermined movement is performed is set in advance together with the route information. The predetermined movement section according to the present exemplary embodiment is a section in which a predetermined movement such as straight movement and turning occurs.

Figure 11:
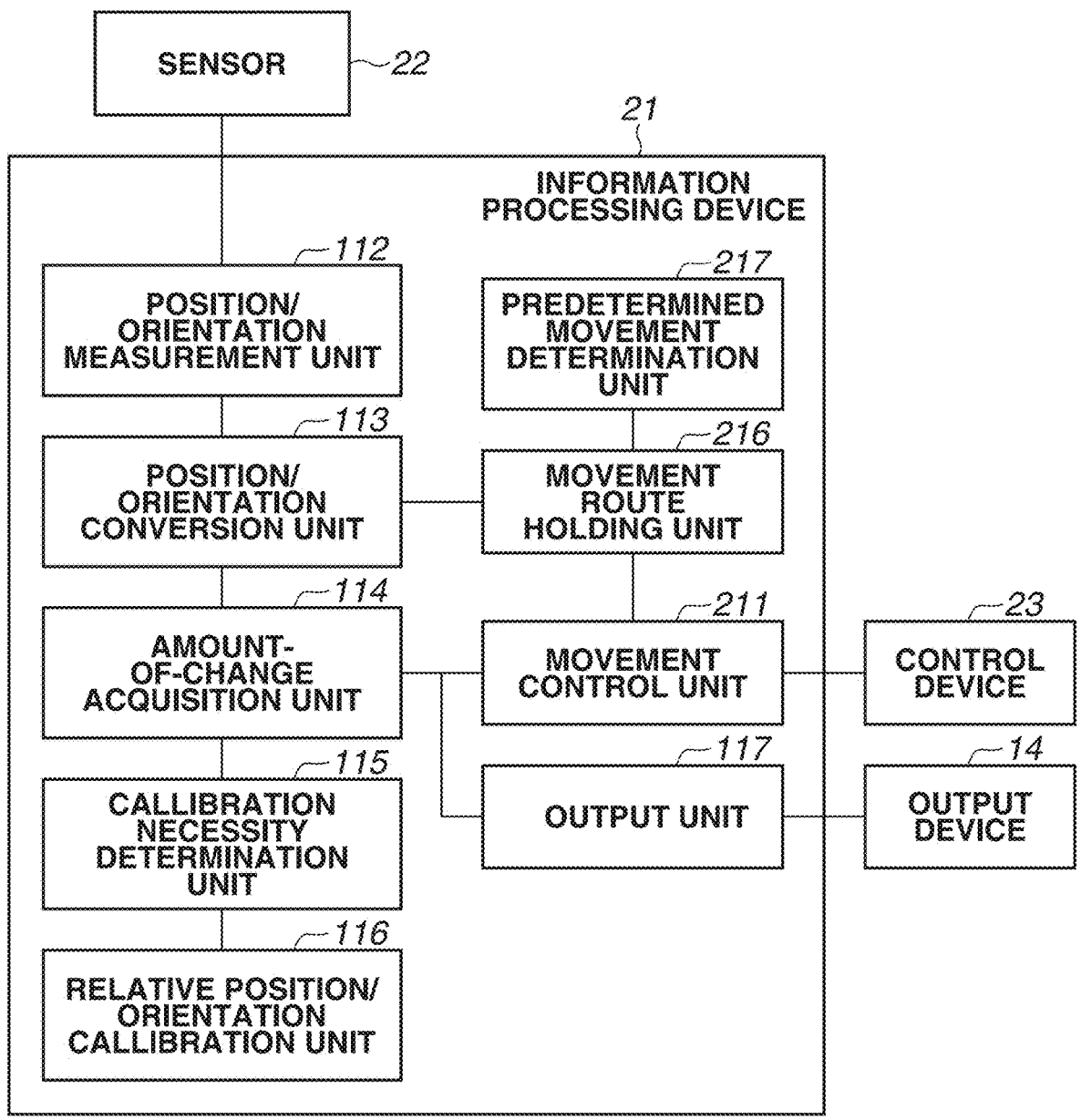
FIG. 11 is a block diagram illustrating a functional configuration example of an information processing device.

The system configuration example according to the present exemplary embodiment is the same as that in the first exemplary embodiment, and includes the information processing device 11 and the vehicle 10 including the sensor 12 as illustrated in FIG. 1. The hardware configuration according to the present exemplary embodiment is the same as that in the first exemplary embodiment illustrated in FIG. 3. The functions of each hardware are the same as those in the first exemplary embodiment and thus the description thereof is omitted. FIG. 11 illustrates an example of a functional configuration according to the present exemplary embodiment. The configuration is different from that in the first exemplary embodiment illustrated in FIG. 2, in that a movement route holding unit 216 and a predetermined movement determination unit 217 are provided. Here, only the parts different from the first exemplary embodiment will be described, and the description of the same parts will be omitted.

The movement route holding unit 216 holds route information for the vehicle 10 to travel on a predetermined route and predetermined movement section information. These pieces of information include the destination and a via point on the traveling route of the vehicle 10 as well as the start point and the end point of the predetermined movement section, and are array data on three position/orientation parameters of the vehicle 10.

The movement control unit 211 generates movement control information using the route information held by the movement route holding unit 216 as an input, and outputs the movement control information to the control device 13. Alternatively, the movement control information generated by an external device or preset movement control information is acquired, and the vehicle 10 is controlled based on the movement control information thus acquired.

The predetermined movement determination unit 217 determines whether the current position of the vehicle 10 is within or outside the predetermined movement section, by using, as inputs, the position/orientation of the sensor 12 input from the position/orientation conversion unit 113 and the predetermined movement section information held by the movement route holding unit 216. A result of the determination is output to the amount-of-change acquisition unit 114.

Figure 9:
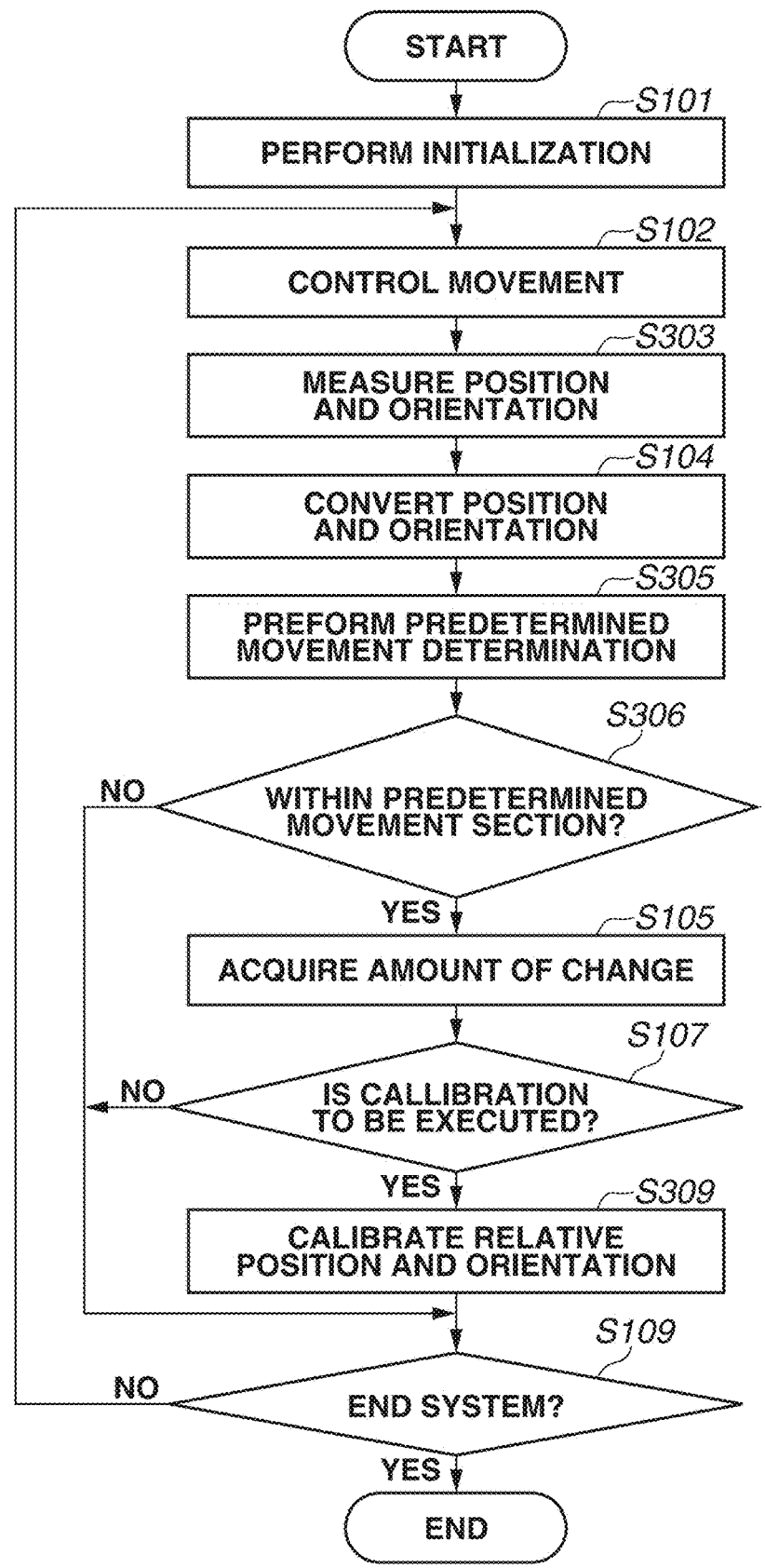
FIG. 9 is a flowchart illustrating processing executed by an information processing device.

FIG. 9 is a flowchart illustrating the processing procedure according to the present exemplary embodiment. The description on processing that is the same as that in FIG. 4 illustrating the processing procedure performed by the information processing device 11 according to the first exemplary embodiment will be omitted. The description is given of steps S302, S305, S306, and S309 different from the processing procedure according to the first exemplary embodiment.

In step S302, the movement control unit 111 performs the movement control on the vehicle 10 by acquiring the movement control information for traveling along the designated route based on the route information held by the movement route holding unit 216, and outputting the movement control information to the control device 13.

In step S305, the predetermined movement determination unit 217 determines whether the vehicle 10 is within or outside the predetermined movement section. Whether the current position of the vehicle 10 is within or outside the predetermined movement section is determined based on the position/orientation of the sensor 12 input from the position/orientation conversion unit 113 and the predetermined movement section information held by the movement route holding unit 216. If the current position is within the predetermined movement section, the determination, together with information about the type of the predetermined movement, is output. The information about the type of the predetermined movement is, for example, a movement pattern including straight movement described in the first exemplary embodiment and turning described in the second exemplary embodiment. If the position of the vehicle 10 is within the predetermined movement section but with a short traveling time in the predetermined movement section, the amount of data about the position/orientation in the position information about the sensor 12 may not be sufficient to acquire the amount of change. Thus, false is output as the determination result even if the current position is within the predetermined movement section with the vehicle 10 that has not traveled in the predetermined movement section for a predetermined period of time or longer.

In step S306, if the determination result obtained by the predetermined movement determination unit 217 is true (YES in step S306), the processing proceeds to step S107. Otherwise (NO in step S306), the processing skips a few steps to directly proceed to step S310. In step S107, the amount-of-change acquisition unit 114 uses the position information about the sensor 12 input by the position/orientation conversion unit 113, to acquire an amount of change between the relative position/orientation held in the RAM H13 and the actual physical relative positional relationship between the vehicle 10 and the sensor 12. At this point, a method of acquiring the amount of change is determined based on the information about the type of the predetermined movement input from the predetermined movement determination unit 217. For example, the method according to the first exemplary embodiment is performed if the type of the predetermined movement is straight movement, and the method according to the second exemplary embodiment is performed if the type of the predetermined movement is turning.

In step S309, the relative position/orientation calibration unit 216 corrects the relative position/orientation to make it match the actual physical relative positional relationship between the vehicle 10 and the sensor 12, based on the amount of change in the relative position/orientation acquired by the amount-of-change acquisition unit 114. In the present exemplary embodiment, the correction is made according to the parameters acquired by the amount-of-change acquisition unit 114. Specifically, if the type of the predetermined movement is straight movement, the orientation parameter is corrected, and if the type is turning, the position parameter is corrected.

In the third exemplary embodiment, whether the current position is within the predetermined movement section is determined with the section in which a predetermined movement occurs set together with the route information for the autonomous traveling of the vehicle 10. Based on a result of the determination, the acquisition and correction of the amount of change in the relative position/orientation of the sensor 12 and the vehicle 10 are dynamically switched. With this configuration, the vehicle 10 can correct the relative position/orientation while autonomously traveling, and a change in the relative positional relationship between the vehicle 10 and the position/orientation estimation device can be easily corrected.

(Modification 3-1)

In the third exemplary embodiment, the movement route holding unit 216 holds route information for the vehicle 10 to travel on a predetermined route and predetermined movement section information. Based on the predetermined movement section information, the predetermined movement determination unit 217 determines whether the current position is within or outside the predetermined movement section relative to the position of vehicle 10. However, this should not be understood in a limiting sense, and any configuration may be employed as long as the predetermined movement determination unit 217 can determine whether the current position is within or outside the predetermined movement section, based on the information held by the movement route holding unit 216. For example, a method may be employed in which the movement route holding unit 216 holds a history of the movement trail of the vehicle 10, and the predetermined movement determination unit 217 extracts a section involving a predetermined movement such as straight movement and turning by performing least squares fitting on the history of the movement trail.

Furthermore, the predetermined movement determination unit 217 may make the determination using other information instead of the information held by the movement route holding unit 216. For example, the movement trail of the vehicle may be obtained using a sensor 12 such as a surveillance camera enabling the vehicle 10 to be monitored from a third person's point of view. Then, whether the current position is within or outside the predetermined movement section and the type of the predetermined movement may be determined based on the movement trail.

Figure 10:
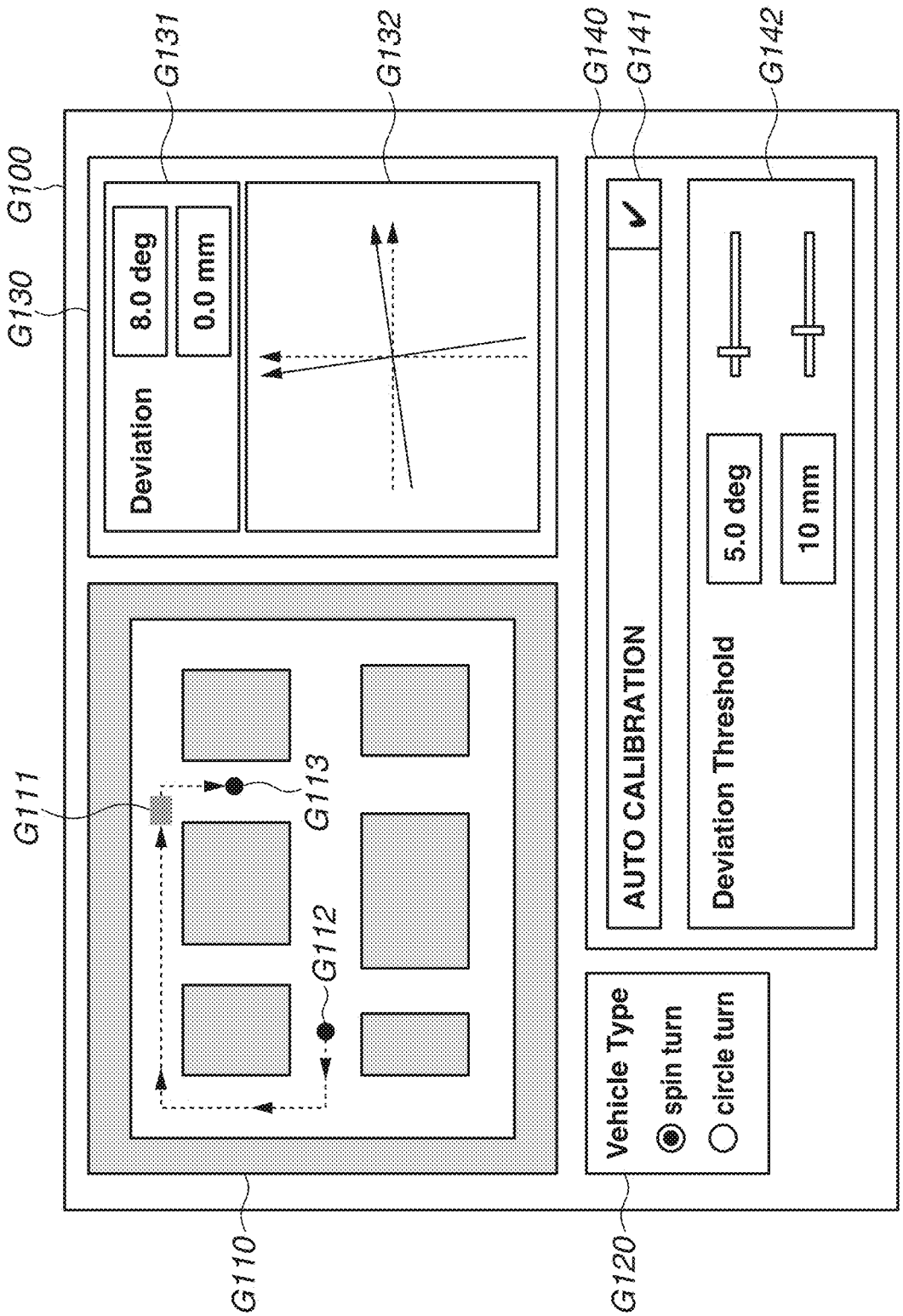
FIG. 10 is a diagram illustrating an example of a graphical user interface (GUI).

The output unit 117 may output output information related to the calibration of the relative position/orientation, such as the predetermined movement section, the amount of change in the relative position/orientation, and the calibration parameter. FIG. 10 illustrates a graphical user interface (GUI) 100 in an example where a display is used as the output device 14 to present the route information and the predetermined movement section information about the vehicle 10 as well as the result of acquiring the amount of change in the relative position/orientation and the calibration parameter.

A GUI G110 presents the movement route information and the predetermined movement section information about the vehicle 10. A vehicle G111 is autonomously traveling between a start point G112 and an end point G113 on the travel route. An arrow line between the start point G112 and the end point G113 is the travel route, and a solid arrow line in particular indicates the predetermined movement section.

A GUI G120 is configured to select the type of movement control on a vehicle 10. Specifically, for the movement control of turning the vehicle 10, the type is selected as one for a case in which the orientation parameter changes as described in the second exemplary embodiment, or one for a case where both the position parameter and the orientation parameter change as in a case of automobile.

A GUI G130 is configured to present the result of acquiring the amount of change in the relative position/orientation. A part G131 displays numerical values of the position and the orientation separately as the amount of change in the relative position/orientation acquired. A part G132 displays each axis (solid arrow lines) of the coordinate system as a result of adding the acquired amount of change to the current vehicle coordinate system (dotted arrow lines). This makes it possible to visually recognize the amount of change in the relative position/orientation. The user can determine whether to correct the attachment position/orientation of the sensor 12. The example illustrated in FIG. 10 is where the orientation (angle) is changed.

A GUI G140 is used for the user to adjust the calibration of relative position/orientation. In a part G141, the auto calibration during the traveling can be enabled by clicking a checkbox. In a part G142, the threshold used for determining whether calibration is to be executed can be determined by threshold adjustment bars being slid from side to side.

As described above, with the GUIs for presenting output result of acquiring the amount of change and the parameter input for calibration, intuitive recognition of the user can be facilitated, whereby usability regarding the correction of the relative position/orientation can further be improved.

In the first and the second exemplary embodiments, when the movement control is performed to cause a predetermined movement of the vehicle 10 such as straight movement and turn, the amount of change in the relative position/orientation of the sensor 12 and the vehicle 10 is acquired based on the position/orientation of the sensor 12, and the relative position/orientation is corrected based on the amount of change. The description on each of the first and the second exemplary embodiments is given assuming that the vehicle 10 is an unmanned carrier that moves on the ground, that is, a two-dimensional plane. Thus, the degree-of-freedom of the position/orientation of the vehicle 10 is three (two position parameters and one orientation parameter).

In a fourth exemplary embodiment, a description is given of a case of application to a vehicle such as a drone that can move and rotate in the height direction (orthogonal to the floor in the real space). Thus, in the fourth exemplary embodiment, a method of correcting the relative position/orientation when the drone moves along a straight line movement trail is described. The degree-of-freedom of the position/orientation of such a vehicle 10 is six (three position parameters and three orientation parameters).

Figure 12:
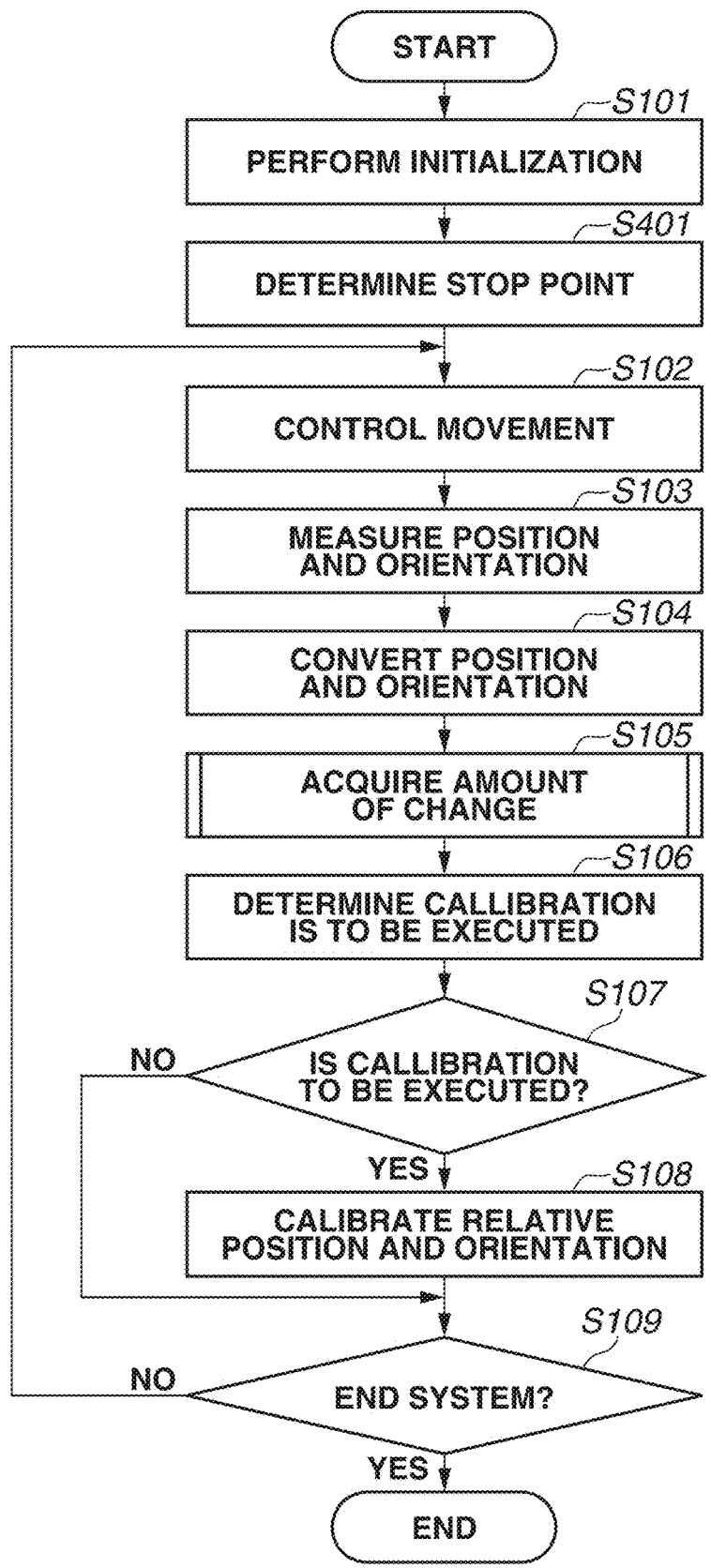
FIG. 12 is a flowchart illustrating processing executed by an information processing device.

The system configuration example according to the present exemplary embodiment is the same as that in the first exemplary embodiment, and includes the information processing device 11 and the vehicle 10 including the sensor 12 as illustrated in FIG. 1. However, there is a difference in that the vehicle 10 can move not in the horizontal direction but also in the vertical direction. Furthermore, there are differences in that the number of orientation parameters of the vehicle 10, which is one (yaw) in the first exemplary embodiment, is three (roll, pitch, yaw) in the present exemplary embodiment, and in that rotation about the three axes X, Y, and Z can be performed. Here, the Z axis is a coordinate axis in the direction orthogonal to the floor in the real space, and roll and pitch are defined as orientation parameters representing rotation about the X axis and the Y axis, respectively. The hardware configuration according to the present exemplary embodiment is the same as that in the first exemplary embodiment illustrated in FIG. 3. The functions of each hardware are the same as those in the first exemplary embodiment and thus the description thereof is omitted. FIG. 12 is a diagram illustrating a processing procedure according to the present exemplary embodiment. Processing procedures different from those in the first exemplary embodiment will be described, and description on the other procedures, which are regarded as being the same as those in FIG. 4, will be omitted.

The drone can move three-dimensionally, and in the present exemplary embodiment, moves along the X axis, the Y axis, and the Z axis in this order. Here, the order of the coordinate axes along which the movement occurs may be any order. A flowchart in FIG. 12 illustrates the processing procedure for each axis.

In step S401, the movement control unit 111 determines a route and a stop point for the movement of the drone, and generates control information. The drone is likely to wobble when moving forward, backward, left, and right, and thus is difficult to move straight. In the present exemplary embodiment, the following movement trail of the vehicle 10 is regarded as a straight line. A stop point, where the drone hovers or lands to stabilize, is provided in the middle of the movement route. The position/orientation of the sensor 12 at this point is used to create a pseudo straightened movement trail. The straightening is obtaining an approximate straight line movement trail easily using a method of excluding position measurement data deviated from the straight line or a method of averaging a group of position measurement data pieces including fluctuations.

In step S102, the movement control unit 111 moves the drone using the control information generated in step S401 as an input. In this process, the drone is temporarily stopped at the stop point.

In step S103, the position/orientation estimation unit 112 estimates the position/orientation of the sensor 12 around the stop point, and outputs an average value as a result of the estimation to the position/orientation conversion unit 113.

In step S104, the position/orientation conversion unit 113 converts the trail of the position/orientation of the sensor 12 input by the position/orientation estimation unit 112 from the sensor coordinate system to the vehicle coordinate system. In the first exemplary embodiment, the six position/orientation parameters are reduced to three position/orientation parameters as the degree-of-freedom on the vehicle coordinate system is three. On the other hand, the vehicle 10 according to the present exemplary embodiment has six degrees-of-freedom and thus the parameters are not reduced.

In step S105, the amount-of-change acquisition unit 114 uses the position information about the sensor 12 at the start point and the stop point input by the position/orientation conversion unit 113 to acquire an amount of change between the relative position/orientation held in the RAM H13 and the actual physical relative positional relationship between the vehicle 10 and the sensor 12. The vehicle 10 moves straight and thus an amount of change in the orientation parameter of the relative position/orientation can be found, but the rotation component in the amount of change obtained depending on the movement direction. Specifically, for movement along the X, Y, and Z axes, rotation components pitch, yaw, and roll are respectively obtained from the position information. The method as in the first exemplary embodiment may be directly used to calculate the amount of change regardless of the movement direction. In the case of Z axis movement, the moving direction and the coordinate axis orthogonal thereto in the first exemplary embodiment are respectively replaced by the Z axis and the Y axis, and the comparison target axis for obtaining the amount of change is replaced with the Z axis. As a result, the amount of change in the orientation parameter Roll is an angle between the Z axis and the approximate straight line obtained using the position information about the sensor 12. On the other hand, in the case of X axis movement, the moving direction and the coordinate axis orthogonal thereto in the first exemplary embodiment are respectively replaced by the X axis and the Z axis, and the comparison target axis for obtaining the amount of change is replaced with the X axis. Thus, the amount of change in the orientation parameter Pitch is an angle between the X axis and the approximate straight line obtained using the position information about the sensor 12.

In step S108, the relative position/orientation calibration unit 116 corrects the relative position/orientation to make it match the actual physical relative positional relationship between the vehicle 10 and the sensor 12, based on the amount of change in the relative position/orientation acquired by the amount-of-change acquisition unit 114. The relative position/orientation is corrected by subtracting the amounts of change in the three orientation parameters obtained in step S105 from the components of the relative position/orientation.

In the fourth exemplary embodiment, the relative position/orientation of the sensor 12 and the vehicle 10 for the vehicle 10 movable in any direction in the three-dimensional space can be corrected without using a highly accurate movement amount of the vehicle 10. Thus, the change in the relative positional relationship between the vehicle 10 and the position/orientation estimation device can be easily corrected.

(Modification 4-1)

In the fourth exemplary embodiment, the movement control unit 111 moves the drone along the X, Y, and Z coordinate axes. However, the movement direction is not limited to that, and may be any direction as long as the amount-of-change acquisition unit 114 can compare the predicted position of the sensor 12 with the position of the vehicle 10, even if the movement direction is not along any of the coordinate axes. The amount-of-change acquisition unit 114 determines a reference two-dimensional plane, and then compares the predicted position of the sensor 12 and the position of the vehicle 10. The reference two-dimensional plane is determined depending on the rotation component of the amount of change to be acquired. Specifically, the rotation component to be acquired is on an XY plane for Yaw, a YZ plane for Roll, and a ZX plane for Pitch. For example, to acquire the amount of change in the rotation component Roll, the movement control unit 111 makes the vehicle 10 move straight on the YZ plane, and compares the predicted position of the sensor 12 with the position of the vehicle 10. Furthermore, when the vehicle 10 is moved in any direction in the XYZ space other than on the YZ plane, the amount of change in Pitch may be acquired by projecting the predicted position of the sensor 12 and the position of the vehicle 10 on the YZ plane, and comparing the position information pieces after the projection on the plane.

(Modification 4-2)

In the fourth exemplary embodiment, the position/orientation estimation unit 112 estimates the position/orientation of the sensor 12 around the stop point, and outputs the average value as a result of the estimation. However, this should not be understood in a limiting sense, and any estimation result may be output as long as the estimation result is obtained from a straightened line with the group of positions/orientations. In other embodiments, the drone immediately after the start of the movement is likely to wobble, and thus, the position/orientation is estimated at constant time intervals after a predetermined time period elapses after the start of the movement. Alternatively, the position/orientation may be estimated at constant distance intervals after the drone has moved by a predetermined distance after the start of the movement to be output to the amount-of-change acquisition unit 114. Furthermore, the position/orientation deviated from the straight line may be excluded regardless of the distance or time after the start of movement.

(Modification 4-3)

In the fourth exemplary embodiment, the movement control unit 111 corrects the three orientation parameters of the relative position/orientation by moving a vehicle straight in each direction along the X axis, the Y axis, and the Z axis. Alternatively, the three position parameters of the relative position/orientation may be corrected by turning a vehicle about the individual coordinate axes in order, instead of moving the vehicle straight. Here, the turning may be implemented by a movement control method of rotating the drone in the air, or a method of turning the drone fixed to a jig so as to rotate about a design turning axis. The position parameter that can be corrected varies among the turning axes, as in the case of the straight movement. Specifically, Y and Z coordinates, Z and X coordinates, and X and Y coordinates can be corrected through an X axis rotation (roll), Y axis rotation (pitch), and Z axis rotation (yaw), respectively. A method that is the same as that in the second exemplary embodiment can be used to acquire the amount of change and perform calibration for the turning. For example, in a case of rotation about the X axis, the two-dimensional plane onto which the position information is mapped according to the second exemplary embodiment is replaced with the YZ plane. The amount of change in the position parameter Y and Z coordinates is a difference between the center coordinates of the approximate circle obtained using the position information about the sensor 12 and the initial position coordinates (origin).

(Modification 4-4)

In the fourth exemplary embodiment, the position/orientation of the sensor 12 around the stop point is used to acquire the amount of change as the drone is difficult to stably move straight. This is not limited to drones. For example, this can be applied to vehicles such as unmanned carriers, autonomous driving vehicles, or autonomously moving robots, all of which move on a two-dimensional plane.

(Modification 4-5)

In Modification 4-2, the position/orientation estimation unit 112 excludes the position/orientation deviated from the straight line to obtain a straight line from a group of estimated positions/orientations of the sensor 12. This is not limited to drones. For example, this can be applied to vehicles such as unmanned carriers, autonomous driving vehicles, or autonomously moving robots, all of which move on a two-dimensional plane.

Of the above-mentioned processing units, the position/orientation measurement unit 112 and the movement control unit 111 may be replaced by a machine-learned trained model to execute the processing. In this case, for example, a plurality of combinations of input data and output data to the processing units is prepared as training data, and a trained model is generated that acquires knowledge from such data through machine learning, and as a result, and output output data corresponding to the input data based on the acquired knowledge. The trained model can be, for example, a neural network model. Then, the trained model executes the processing of the processing units by cooperating with a CPU, a GPU, or the like as a program for executing the processing that is the same as that executed by the processing units. The trained model may be updated after certain processing as appropriate.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-027743, filed Feb. 21, 2020, which is hereby incorporated by reference herein in its entirety.

What is claimed is:

1. A device comprising: at least one processor; and
a memory coupled to the at least one processor, the memory having instructions that, when executed by the processor, causes the at least one processor to function as:
an estimation unit configured to estimate, when a vehicle provided with a sensor makes a predetermined movement, first position information indicating positions of the vehicle based on input information of the sensor and an orientation of the sensor relative to the vehicle; and
an acquisition unit configured to acquire second position information indicating expected positions of the vehicle corresponding to the predetermined movement while maintaining an original orientation of the sensor relative to the vehicle held by a holding unit;
an output unit configured to output an amount of change between the orientation of the sensor relative to the vehicle when the vehicle has performed the predetermined movement and the original orientation, based on the first position information and the second position information, wherein a control is performed to cause the orientation of the sensor to change by the amount of change.

2. The device according to claim 1, wherein the output unit outputs output information indicating a difference in the position of the vehicle based on the first position information and the second position information.

3. The device according to claim 1, wherein the output unit outputs output information indicating that the orientation of the sensor relative to the vehicle is the predetermined orientation of the sensor relative to the vehicle, when a difference in the position of the vehicle based on the first position information and the second position information is smaller than a predetermined threshold.

4. The device according to claim 1, wherein the output unit outputs output information indicating that the orientation of the sensor relative to the vehicle is not the predetermined orientation of the sensor relative to the vehicle, when a difference in the position of the vehicle based on the first position information and the second position information is equal to or greater than a predetermined threshold.

5. The device according to claim 1, wherein the output unit outputs, to a display device, output information indicating that the orientation of the sensor relative to the vehicle is not the predetermined orientation of the sensor relative to the vehicle, when a difference in the position of the vehicle based on the first position information and the second position information is equal to or greater than a predetermined threshold.

6. The device according to claim 1, wherein the output unit outputs output information to make a display device display the position of the vehicle indicated by the first or the second position information, when a difference in the position of the vehicle based on the first position information and the second position information is equal to or greater than a predetermined threshold.

7. The device according to claim 1, wherein the output unit outputs, to an audio output device, output information indicating that the orientation of the sensor relative to the vehicle is not the predetermined orientation of the sensor relative to the vehicle, when a difference in the position of the vehicle based on the first position information and the second position information is equal to or greater than a predetermined threshold.

8. The device according to claim 1, wherein the output unit outputs, to a projection device or a display device, output information indicating the orientation of the sensor corresponding to the predetermined orientation of the sensor relative to the vehicle, when a difference in the position of the vehicle based on the first position information and the second position information is larger than a predetermined value.

9. The device according to claim 1, wherein the output unit outputs output information differing depending on a magnitude of a difference in the position of the vehicle based on the first position information and the second position information based on a plurality of thresholds.

10. The device according to claim 8, wherein the output unit outputs output information to a first output device when the difference in the position of the vehicle based on the first position information and the second position information is larger than a first threshold, and outputs the output information to a second output device when the difference in the position of the vehicle between the first position information and the second position information is larger than a second threshold that is smaller than the first threshold.

11. The device according to claim 1,
wherein the predetermined movement is a movement of the vehicle moving straight by a predetermined distance, and
wherein the output unit outputs output information indicating a change in an orientation of the sensor based on a difference in the position of the vehicle based on the first position information and the second position information.

12. The device according to claim 1,
wherein the predetermined movement is a movement of the vehicle turning by a predetermined angle, and
wherein the output unit outputs output information indicating a change in a position of the sensor based on a difference in the position of the vehicle based on the first position information and the second position information.

13. The device according to claim 1, wherein the at least one processor further functions as an update unit configured to update the orientation of the sensor relative to the vehicle based on output information, when a difference in the position of the vehicle based on the first position information and the second position information is larger than a predetermined threshold.

14. The device according to claim 1,
wherein the at least one processor further functions as a measurement unit configured to measure a position of the sensor from the input information, based on map information obtained by measuring a movement route of the vehicle in advance, and
wherein the estimation unit estimates the position of the vehicle by converting the measured position or orientation of the sensor, based on the predetermined orientation of the sensor relative to the vehicle.

15. The device according to claim 1, wherein the sensor is an image capturing device that captures an image of an object in an environment.

16. The device according to claim 1, wherein the sensor is a range sensor that measures a distance between an object in an environment and the sensor.

17. A method comprising:
estimating, when a vehicle provided with a sensor makes a predetermined movement, first position information indicating positions of the vehicle based on input information of the sensor and an orientation of the sensor relative to the vehicle; and
acquiring second position information indicating expected positions of the vehicle corresponding to the predetermined movement while maintaining an original orientation of the sensor relative to the vehicle held by a holding unit;
outputting an amount of change in a between the orientation of the sensor relative to the vehicle when the vehicle has performed the predetermined movement and the original orientation, based on the first position information and the second position information,
wherein a control is performed to cause the sensor to change by the amount of change.

18. A non-transitory computer-readable storage medium storing a computer executable program for causing a computer to perform a method, the method comprising:
estimating, when a vehicle provided with a sensor makes a predetermined movement, first position information indicating positions of the vehicle based on input information of the sensor and an orientation of the sensor relative to the vehicle; and acquiring second position information indicating expected positions of the vehicle corresponding to the predetermined movement while maintaining an original orientation of the sensor relative to the vehicle held by a holding unit;

outputting an amount of change between the orientation of the sensor relative to the vehicle when the vehicle has performed the predetermined movement and the original orientation, based on the first position information and the second position information, wherein a control is performed to cause the sensor to change by the amount of change.

19. The device according to claim 1, wherein the at least one processor further functions as an acquisition unit configure to acquire the second position information indicating a trail of the vehicle corresponding to the predetermined movement, and wherein the output unit outputs the vehicle based on the second position information acquired by the acquisition unit.

20. The device according to claim 1, wherein the first position information indicates a trail of the amount of change from the predetermined orientation of the sensor based on the sensor information.

\* \* \* \* \*